(12) United States Patent
Kaplan et al.

(10) Patent No.: US 6,453,928 B1
(45) Date of Patent: Sep. 24, 2002

(54) APPARATUS, AND METHOD FOR PROPELLING FLUIDS

(75) Inventors: Shay Kaplan, Givat Elah; Amit Shacham, Haifa, both of (IL)

(73) Assignee: Nanolab Ltd., Haifa (IL)

( * ) Notice: Subject to any disclaimer, the term of this patent is extended or adjusted under 35 U.S.C. 154(b) by 0 days.

(21) Appl. No.: 09/755,154

(22) Filed: Jan. 8, 2001

(51) Int. Cl.⁷ .............................. F17D 1/18; F15B 21/00
(52) U.S. Cl. .................. 137/14; 137/806; 137/807; 137/828; 137/833; 137/252; 422/82; 422/103
(58) Field of Search ............................ 137/833, 827, 137/828, 807, 806, 252, 14; 422/82, 103

(56) References Cited

U.S. PATENT DOCUMENTS

| | | | | |
|---|---|---|---|---|
| 3,811,474 A | * | 5/1974 | Bauer et al. | 137/833 |
| 4,676,274 A | * | 6/1987 | Brown | 137/806 |
| 4,949,742 A | * | 8/1990 | Rando et al. | 137/828 |
| 5,789,045 A | * | 8/1998 | Wapner et al. | 137/807 |
| 6,152,181 A | * | 11/2000 | Wapner et al. | 137/807 |
| 6,213,151 B1 | * | 4/2001 | Jacobson et al. | 137/827 |

* cited by examiner

Primary Examiner—A. Michael Chambers
(74) Attorney, Agent, or Firm—Eitan, Pearl, Latzer & Cohen-Zedek

(57) ABSTRACT

A device for moving a fluid in a fluidics system. The device may include one or more controllably openable closed chambers. The pressure within the closed chamber(s) is lower than the ambient pressure outside the fluidics system or lower than the pressure within another channel of the fluidic system. The closed chamber(s) is configured for being controllably opened. The chamber (or chambers) is configured such that when a chamber is opened the chamber is in fluidic communication with a flow channel included within the fluidics system. The fluid may be moved into the flow channel or may be moved within the flow channel. The fluid may be a liquid, a gas, a mixture of gases or an aerosol. The fluidics system may include a controller for controlling the opening of a selected chamber or chambers.

87 Claims, 11 Drawing Sheets

APPARATUS, AND METHOD FOR PROPELLING FLUIDS

FIELD OF THE INVENTION

The present invention relates generally to the field of devices and methods for moving fluids within fluidic systems, and more specifically to methods and devices for moving fluids in microfluidics systems and devices.

BACKGROUND OF THE INVENTION

Microfluidics systems and devices known in the art often propel fluids such as liquids or gasses by moving the fluids through channels or passages formed within various substrates. Typically, in such microfluidics systems, the moving of the fluids may be achieved by capillary effects or by using suitable micropumps and/or other material transport devices or sub-systems. Such micropumps may operate, inter alia, by using piezoelectric effects, electrostatic effects, electro-osmotic effects, mechanical effects or electromagnetic effects. The construction of such micropumps may require costly manufacturing methods. Certain types of mechanical or electromechanical micropumps, such as, for example valve or diaphragm operated micropumps may move or propel fluids within fluidic channels by controllably and actively producing positive or negative pressure within parts of such fluidic channels in the fluidic system to induce a pressure gradient within different portions of the fluidic system for pushing or pulling fluids in a desired direction within a flow channel.

Typically, the amounts of fluids pumped by such micropumps may depend, inter alia, on the type of fluid pumped. Often, in mechanically or valve based micropumps the amount of fluid pumped may depend on the number of pump strokes. In some micropumps it may be necessary to count and calibrate pump strokes for different types of pumped fluids, or to use flow sensors or detectors for quantitating or monitoring the pumped fluid volume or the fluid's flow or position.

Integrated microfluidics systems may also be connected through suitable ports or channels to one or more external sources of positive and/or negative pressure for propelling one or more fluids within one or more flow channels included in the system.

In addition, the operation of some micropumps may involve further design considerations which take into account dead volume and pump priming. Integration of such micropumps with other components to form entire systems may therefore often be complicated, costly and cumbersome.

There is therefore a long felt need for simple methods and devices for moving or propelling fluids in microfluidics systems and other fluidic systems which may be easily integrated into, or fabricated within, or added to such systems, using standard manufacturing and/or microfabrication techniques and which may allow for controllably propelling fluids such as liquids or gasses within such fluidic systems and/or microfluidics systems and other fluidic systems.

SUMMARY OF THE INVENTION

There is therefore provided, in accordance with a preferred embodiment of the present invention, a method for moving a fluid in a fluidics system. The method includes the step of providing a flow channel having a first pressure level therein. The method also includes the step of providing at least one openable closed chamber in operative communication with the flow channel. The at least one openable closed chamber has a second pressure level therewithin. The second pressure level is lower than the first pressure level. The method also includes the step of opening the at least one openable chamber for reducing the pressure within the flow channel to move a fluid disposed within the flow channel.

Furthermore, in accordance with another preferred embodiment of the present invention, the first pressure level is the pressure level outside the fluidics system.

There is also provided, in accordance with another preferred embodiment of the present invention, a method for moving a liquid into a fluidics system. The method includes the step of providing a flow channel. The flow channel is in operative communication with at least one inlet port. The at least one inlet port is sealingly covered with the liquid. The flow channel has a first pressure level therein. The method also includes the step of providing at least one openable closed chamber in operative communication with the flow channel. The at least one openable closed chamber has a second pressure level therewithin. The second pressure level is lower than the first pressure level. The method also includes the step of opening the at least one openable chamber for reducing the pressure within the flow channel to move the liquid into the flow channel.

Furthermore, in accordance with another preferred embodiment of the present invention, the first pressure level is the pressure level outside the fluidics system.

There is also provided, in accordance with another preferred embodiment of the present invention, a method for moving a fluid into a fluidics system. The method includes the step of providing a flow channel. The flow channel is in operative communication with at least one inlet port. The at least one inlet port is disposed within the fluid. The flow channel has a first pressure level therein. The method also includes the step of providing at least one openable closed chamber in operative communication with the flow channel. The at least one openable closed chamber has a second pressure level therewithin. The second pressure level is lower than the first pressure level. The method also includes the step of opening the at least one openable chamber for reducing the pressure within the flow channel to move the fluid into the flow channel.

Furthermore, in accordance with another preferred embodiment of the present invention, the first pressure level is the pressure level outside the fluidics system.

There is also provided, in accordance with another preferred embodiment of the present invention, a method for constructing a fluidic device. The method includes the step of providing at least one flow channel within the device. The method also includes the step of providing at least one openable closed chamber in operative communication with the at least one flow channel. The closed chamber has a first pressure level therewithin. The first pressure level is lower than the pressure level outside the fluidic device.

Furthermore, in accordance with another preferred embodiment of the present invention, the at least one openable closed chamber is configured for being controllably opened to allow pressure equalization between the at least one openable chamber and the at least one flow channel.

There is also provided, in accordance with another preferred embodiment of the present invention, a method for moving a liquid into a fluidics system. The method includes the step of providing a flow channel having at least one inlet port. The method also includes the step of providing one or more openable closed chambers. The pressure within the one or more openable closed chambers is lower than the ambient pressure outside the fluidic system. Each chamber of the one or more openable closed chambers is configured for being controllably openable. Each chamber of the one or more openable closed chambers is in operative communication with the flow channel. The one or more openable closed chambers are configured for being controllably opened to allow pressure equalization between the flow channel and the one or more openable closed chambers. The method also includes the step of sealingly covering the at least one inlet port of the flow channel with the liquid. The method also includes the step of opening at least one chamber of the one or more openable closed chambers for moving at least a portion of the liquid into the flow channel.

Furthermore, in accordance with another preferred embodiment of the present invention, the step of opening includes opening one or more chambers of the one or more openable closed chambers to reduce the pressure within the flow channel below the ambient pressure.

Furthermore, in accordance with another preferred embodiment of the present invention, the moving of the liquid into the flow channel is controlled by varying the number of chambers opened in the step of opening.

Furthermore, in accordance with another preferred embodiment of the present invention, the one or more openable closed chambers comprises a plurality of openable closed chambers. At least one of the plurality of openable closed chambers has a volume different than the volume of the remaining chambers of the plurality of openable closed chambers. The moving of the liquid into the flow channel is controlled by the total volume of the chambers opened in the step of opening.

Furthermore, in accordance with another preferred embodiment of the present invention, the one or more openable closed chambers comprises a plurality of openable closed chambers. The step of opening includes simultaneously or sequentially opening a selected number of chambers of the plurality of openable closed chambers to control one or more parameters of flow of the liquid into the flow channel, through the at least one inlet port.

Furthermore, in accordance with another preferred embodiment of the present invention, the one or more parameters of flow are selected from the rate of flow of the liquid into the flow channel, the amount of the liquid flowing into the flow channel, the rate of change of the rate of flow of the liquid within the flow channel and combinations thereof.

There is also provided, in accordance with another preferred embodiment of the present invention, a method for moving a fluid into a fluidics system. The method includes the step of providing a flow channel having at least one inlet port. The at least one inlet port has an opening. The method also includes the step of providing one or more openable closed chambers. The pressure within the one or more openable closed chambers is lower than the ambient pressure outside the fluidic system. Each chamber of the one or more openable closed chambers is configured for being controllably openable. Each chamber of the one or more openable closed chambers is in operative communication with the flow channel. The one or more openable closed chambers are configured for being controllably opened to allow pressure equalization between the flow channel and the one or more openable closed chambers. The method also includes the step of disposing the opening of the at least one inlet port of the flow channel within the fluid. The method also includes the step of opening at least one chamber of the one or more openable closed chambers for moving at least a portion of the fluid into the flow channel.

Furthermore, in accordance with another preferred embodiment of the present invention, the step of opening includes opening one or more chambers of the one or more openable closed chambers to reduce the pressure within the flow channel below the ambient pressure.

Furthermore, in accordance with another preferred embodiment of the present invention, the moving of the fluid into the flow channel is controlled by varying the number of chambers opened in the step of opening.

Furthermore, in accordance with another preferred embodiment of the present invention, the one or more openable closed chambers includes a plurality of openable closed chambers. At least one of the plurality of openable closed chambers has a volume different than the volume of the remaining chambers of the plurality of openable closed chambers. The moving of the fluid into the flow channel is controlled by the total volume of the chambers opened in the step of opening.

Furthermore, in accordance with another preferred embodiment of the present invention, the one or more openable closed chambers includes a plurality of openable closed chambers. The step of opening includes simultaneously or sequentially opening a selected number of chambers of the plurality of openable closed chambers to control one or more parameters of flow of the fluid into the flow channel, through the at least one inlet port.

Furthermore, in accordance with another preferred embodiment of the present invention, the one or more parameters of flow are selected from the rate of flow of the fluid into the flow channel, the amount of the fluid flowing into the flow channel, the rate of change of the rate of flow of the fluid within the flow channel and combinations thereof.

There is also provided, in accordance with another preferred embodiment of the present invention, a method for moving a liquid within a fluidics system. The method includes providing a flow channel having at least a first end and a second end thereof. The method also includes providing one or more openable closed chambers. The pressure within the one or more openable closed chambers is lower than the ambient pressure outside the fluidic system. Each chamber of the one or more openable closed chambers is in operative communication with a portion of the flow channel. Each chamber of the one or more openable closed chambers is configured for being controllably opened to allow pressure equalization between the flow channel and the one or more openable closed chambers. The method also includes providing a quantity of the liquid disposed within the flow channel between the first end and the second end of the flow channel. The first end of the flow channel opens outside the fluidic system and is subjected to the ambient pressure. The method also includes opening at least one chamber of the one or more openable closed chambers to the portion of the flow channel for lowering the pressure within the portion of the flow channel below the ambient pressure for moving the liquid within the flow channel.

Furthermore, in accordance with another preferred embodiment of the present invention, the moving of the liquid into the flow channel is controlled by varying the number of chambers opened in the step of opening.

Furthermore, in accordance with another preferred embodiment of the present invention, the one or more openable closed chambers includes a plurality of openable closed chambers. At least one of the plurality of openable closed chambers has a volume different than the volume of the remaining chambers of the plurality of openable closed chambers. The moving of the liquid into the flow channel is controlled by the combined volume of the chambers opened in the step of opening.

Furthermore, in accordance with another preferred embodiment of the present invention, the one or more openable closed chambers includes a plurality of openable closed chambers. The opening comprises simultaneously or sequentially opening a selected number of chambers of the plurality of openable closed chambers to control one or more parameters of flow of the liquid flowing into the flow channel.

Furthermore, in accordance with another preferred embodiment of the present invention, The one or more parameters of flow are selected from the rate of flow of the liquid into the flow channel, the amount of the liquid flowing into the flow channel, the rate of change of the rate of flow of the liquid within the flow channel and combinations thereof.

There is also provided, in accordance with another preferred embodiment of the present invention, a method for moving a liquid within or into a microfluidics device. The method includes opening at least one openable closed chamber included in the microfluidics device. The pressure within the at least one openable closed chamber is lower than the ambient pressure outside the microfluidics device. The opening produces a net force acting on a quantity of the liquid disposed within or on the microfluidics device to move at least a portion of the quantity of liquid within or into the device.

There is also provided, in accordance with another preferred embodiment of the present invention, a method for moving a liquid disposed within at least one flow channel in a microfluidics device. The method includes opening at least one openable closed chamber included in the microfluidics device. The at least one openable closed chamber is in operative communication with the at least one flow channel. The pressure within the at least one openable closed chamber is lower than the ambient pressure outside the microfluidics device, to produce a net force acting on the liquid for moving at least a portion of the liquid within the device.

There is also provided, in accordance with another preferred embodiment of the present invention, a method for introducing a liquid into a microfluidics device. The method includes the step of sealingly covering an opening of at least one inlet port included in the microfluidics device with a quantity of the liquid. The inlet port is in communication with at least one flow channel included within the microfluidics device. The method also includes the step of opening at least one openable closed chamber included in the microfluidics device, to produce a net force acting on a portion of the liquid disposed within the microfluidics device to move at least a portion of the quantity of liquid into the at least one flow channel. The pressure within the at least one openable closed chamber is lower than the ambient pressure outside the microfluidics device.

There is also provided, in accordance with another preferred embodiment of the present invention, a method for moving a fluid within or into a microfluidics device. The method includes opening at least one openable closed chamber included in the microfluidics device. The pressure within the at least one openable closed chamber is lower than the ambient pressure outside the microfluidics device. The opening reduces the pressure within the microfluidics device to move at least a portion of a quantity of the fluid disposed within or outside the microfluidics device within or into the device.

There is also provided, in accordance with another preferred embodiment of the present invention, a method for moving a fluid disposed within at least one flow channel in a microfluidics device. The method includes opening at least one openable closed chamber included in the microfluidics device. The at least one openable closed chamber is in operative communication with the at least one flow channel, to induce a flow of the fluid for moving at least a portion of the fluid within the device. The pressure within the at least one openable closed chamber is lower than the ambient pressure outside the microfluidics device.

There is also provided, in accordance with another preferred embodiment of the present invention, a method for introducing a fluid into a microfluidics device. The method includes the step of disposing an opening of at least one inlet port included in the microfluidics device within the fluid. The inlet port is in communication with at least one flow channel included within the microfluidics device. The method also includes the step of opening at least one openable closed chamber included in the microfluidics device. The pressure within the at least one openable closed chamber is lower than the ambient pressure outside the microfluidics device. The opening induces a flow of the fluid for moving at least a portion of the fluid into the device through the opening of the at least one inlet port.

There is also provided, in accordance with another preferred embodiment of the present invention, a device for moving a fluid in a fluidic system. The device includes one or more openable closed chambers. The pressure within the one or more openable closed chambers is lower than the ambient pressure outside the fluidic system. The one or more openable closed chambers are in operative communication with a flow channel included within the fluidic system. The one or more openable closed chambers are configured for being controllably opened to allow pressure equalization between the flow channel and the one or more openable closed chambers.

Furthermore, in accordance with another preferred embodiment of the present invention, the at least one of the one or more openable closed chambers comprises a plurality of operatively interconnected chambers.

Furthermore, in accordance with another preferred embodiment of the present invention, at least one chamber of the plurality of operatively interconnected chambers is configured for being controllably opened.

Furthermore, in accordance with another preferred embodiment of the present invention, more than one chamber of the plurality of operatively interconnected chambers is configured for being controllably opened.

Furthermore, in accordance with another preferred embodiment of the present invention, the one or more openable closed chambers are formed within a substrate.

Furthermore, in accordance with another preferred embodiment of the present invention, the substrate is a multi layered substrate.

Furthermore, in accordance with another preferred embodiment of the present invention, at least one chamber of the one or more openable closed chambers comprises an openable sealed cavity formed within a substrate.

Furthermore, in accordance with another preferred embodiment of the present invention, at least one chamber of the one or more openable closed chambers comprises a passage formed within a substrate, and at least two sealing members sealingly attached to the substrate.

Furthermore, in accordance with another preferred embodiment of the present invention, at least one chamber of the one or more openable closed chambers is configured for being controllably opened by an opening mechanism.

Furthermore, in accordance with another preferred embodiment of the present invention, the one or more openable closed chambers comprises a plurality of individually openable closed chambers, the pressure within each openable closed chamber of the plurality of individually openable closed chambers is lower than the ambient pressure outside the fluidic system.

Furthermore, in accordance with another preferred embodiment of the present invention, each chamber of the plurality of individually openable closed chambers is selectably openable.

Furthermore, in accordance with another preferred embodiment of the present invention, the fluidic system includes a controller for controlling the opening of one or more chambers of the plurality of individually openable closed chambers.

Furthermore, in accordance with another preferred embodiment of the present invention, the controller is a programmable controller, configured for being programmed to controllably open any combination of chambers selected from the plurality of individually openable closed chambers.

Furthermore, in accordance with another preferred embodiment of the present invention, all openable closed chambers of the plurality of individually openable closed chambers have a substantially similar volume.

Furthermore, in accordance with another preferred embodiment of the present invention, at least one openable closed chamber of the plurality of individually openable closed chambers has a volume different than the volume of the remaining openable closed chambers of the plurality of individually openable closed chambers.

Furthermore, in accordance with another preferred embodiment of the present invention, at least one chamber of the one or more openable closed chambers comprises an openable closed primary chamber and one or more non-openable secondary chambers. The one or more secondary chambers are in operative communication with the openable primary chamber.

Furthermore, in accordance with another preferred embodiment of the present invention, each chamber of the one or more openable closed chambers includes a portion of a substrate having a cavity formed therein, and an openable sealing member sealingly attached to the substrate for sealing the cavity.

Furthermore, in accordance with another preferred embodiment of the present invention, the substrate is a multi layered substrate.

Furthermore, in accordance with another preferred embodiment of the present invention, the openable sealing member is configured for being mechanically opened by an opening member included in the fluidic system.

Furthermore, in accordance with another preferred embodiment of the present invention, the openable sealing member is configured for being mechanically opened by a controllably actuated opening mechanism included in the fluidic system.

Furthermore, in accordance with another preferred embodiment of the present invention, the openable sealing member includes a sealing layer attached to the substrate, and a heating element thermally coupled to the sealing layer.

Furthermore, in accordance with another preferred embodiment of the present invention, the heating element comprises an electrically resistive member, operatively connectable to an electrical power source.

Furthermore, in accordance with another preferred embodiment of the present invention, the heating element is attached to or deposited on the sealing layer.

Furthermore, in accordance with another preferred embodiment of the present invention, the openable sealing member includes a sealing layer attached to the substrate and at least one electrically resistive member attached to the sealing layer or thermally coupled thereto. The at least one electrically resistive member is operatively connected to an electrical power source included in the fluidics system.

Furthermore, in accordance with another preferred embodiment of the present invention, the openable sealing member is configured to be thermo-mechanically opened by controllably passing current from the power source through the at least one electrically resistive member for heating the at least one electrically resistive member and the sealing layer. The heating generates mechanical stress in the sealing layer to open the layer by forming at least one opening therein.

Furthermore, in accordance with another preferred embodiment of the present invention, the sealing layer includes a meltable substance. The openable sealing member is configured to be thermally opened by controllably passing an electrical current from the electrical power source through the at least one resistive member for heating the at least one resistive member and the sealing layer attached thereto or thermally coupled thereto. The heating melts at least a portion of the sealing layer to form at least one opening therethrough.

Furthermore, in accordance with another preferred embodiment of the present invention, the openable sealing member includes a layer including an electrically resistive material. The layer is attached to the substrate to seal the cavity. The layer is operatively connectable to an electrical power source included in the fluidics system.

Furthermore, in accordance with another preferred embodiment of the present invention, the layer is configured for being thermally opened by controllably passing current from the electrical power source through the layer, for melting, or burning, or vaporizing at least a portion of the layer to open or breach the openable sealing member.

Furthermore, in accordance with another preferred embodiment of the present invention, at least one openable closed chamber of the one or more openable closed chambers includes a portion of a substrate having a passage passing therethrough. The passage has a first opening and a second opening. The openable closed chamber also includes an openable sealing member sealingly attached to the substrate for sealing the first opening. The openable closed chamber also includes a second sealing member sealingly attached to the substrate for sealing the second opening.

Furthermore, in accordance with another preferred embodiment of the present invention, the substrate is a multi layered substrate.

Furthermore, in accordance with another preferred embodiment of the present invention, the openable sealing member is configured for being mechanically opened by an opening member included in the fluidic system.

Furthermore, in accordance with another preferred embodiment of the present invention, the openable sealing member is configured for being mechanically opened by a controllably actuated opening mechanism included in the fluidic system.

Furthermore, in accordance with another preferred embodiment of the present invention, the openable sealing member includes a sealing layer and at least one resistive member attached to the sealing layer or thermally coupled thereto. The at least one resistive member is operatively connectable to an electrical power source included in the fluidics system.

Furthermore, in accordance with another preferred embodiment of the present invention, the openable sealing member is configured for being thermo-mechanically breached by controllably passing current from the electrical power source through the at least one resistive member for heating the at least one resistive member and the sealing layer attached thereto or thermally coupled thereto. The heating produces mechanical stress in the sealing layer to breach the sealing layer.

Furthermore, in accordance with another preferred embodiment of the present invention, the sealing layer includes a meltable substance. The openable sealing member is configured to be thermally opened by controllably passing an electrical current from the electrical power source through the at least one resistive member, for heating the at least one resistive member and the sealing layer attached thereto or thermally coupled thereto. The heating melts at least a portion of the sealing layer to form at least one opening therethrough.

Furthermore, in accordance with another preferred embodiment of the present invention, the openable sealing member includes a resistive layer attached to the substrate to seal the first opening. The resistive layer is operatively electrically connectable to an electrical power source.

Furthermore, in accordance with another preferred embodiment of the present invention, the electrical power source is included in the fluidics system.

Furthermore, in accordance with another preferred embodiment of the present invention, the resistive layer is configured to be thermally opened by controllably passing an electrical current from the power source through the resistive layer, for melting, burning, or vaporizing at least a portion of the resistive layer to open the resistive layer.

There is also provided in a microfluidics system, in accordance with another preferred embodiment of the present invention, a device for moving a fluid within the microfluidics system. The device includes at least one openable closed chamber. The pressure within the closed chamber is lower than the pressure outside the microfluidics system. The at least one openable closed chambers is in operative communication with a flow channel included within the fluidic system. The at least one openable closed chamber is configured for being controllably opened to allow pressure equalization between the flow channel and the at least one openable closed chambers.

Furthermore, in accordance with another preferred embodiment of the present invention, the at least one openable chamber includes an openable sealed cavity formed within a substrate.

Furthermore, in accordance with another preferred embodiment of the present invention, at least part of the microfluidics system is formed within the substrate.

Furthermore, in accordance with another preferred embodiment of the present invention, the substrate is a multi-layered substrate.

There is also provided, in accordance with another preferred embodiment of the present invention, a microfluidics system. The microfluidics system includes a flow channel disposed within the microfluidics system. The microfluidics system also includes at least one openable closed chamber. The at least one openable closed chamber is in operative communication with a flow channel included within the microfluidics system. The at least one openable closed chamber is configured for being controllably opened to allow pressure equalization between the flow channel and the at least one openable closed chambers.

There is also provided, in accordance with another preferred embodiment of the present invention, a microfluidics device. The microfluidics device includes at least one openable closed chamber. The pressure within the at least one openable closed chamber is lower than the ambient pressure outside the microfluidics device. The at least one openable closed chamber is in operative communication with a flow channel included within the microfluidics device. The at least one openable closed chamber is configured for being controllably opened to induce a fluid to flow within the flow channel.

Finally, in accordance with another preferred embodiment of the present invention, the fluid is selected from a liquid, a gas, a mixture of gases, and an aerosol.

BRIEF DESCRIPTION OF THE DRAWINGS

The invention is herein described, by way of example only, with reference to the accompanying drawings, in which like components are designated by like reference numerals, wherein.

Figure 1A:
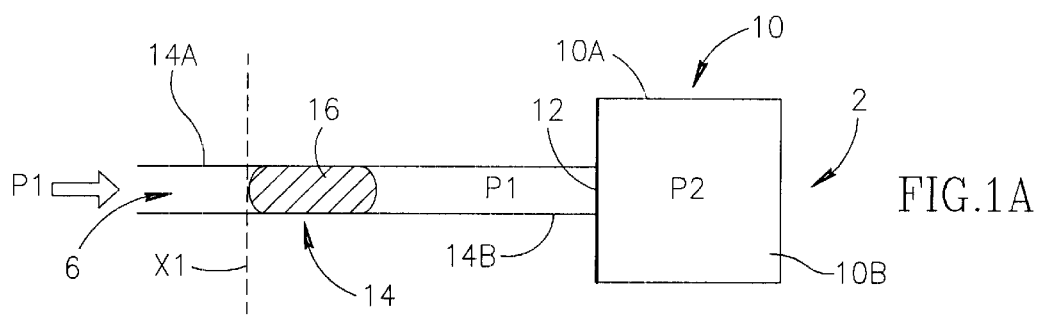
FIGS. 1A–1C are schematic diagrams useful in understanding the principles of operation of the methods, devices and systems for propelling fluids of the present invention.

DETAILED DESCRIPTION OF THE INVENTION
Notation Used Throughout
The following notation is used throughout this document.

| Term | Definition |
| --- | --- |
| AC | Alternating Current |
| CVD | Chemical Vapor Deposition |
| DC | Direct current |
| LPCVD | Low Pressure Chemical Vapor Deposition |
| PVDC | Polyvinylidene Chloride |

It is noted that for the sake of clarity of illustration, the devices and systems of the present application illustrated in the drawing figures are not drawn to scale and that the dimensions of the various layers and components illustrated in the drawing figures relative to each other do not necessarily represent their true dimensions or their dimensions relative to other layers or components within the same drawing figure.

It is further noted that for the purpose of the present application the word fluid means a liquid or a gas or a mixture of gases or an aerosol including fine solid particles or droplets of liquid dispersed in a gas or in a mixture of gases.

The method of moving or propelling fluids of the present invention is generally based on including one or more controllably openable closed chambers within the fluidic system. The pressure within each of these sealed chambers is lower than the ambient pressure outside the fluidic system. Each sealed chamber is configured for being controllably opened. The fluidic system is constructed. such that when a chamber is opened, the chamber is in fluidic communication with a flow channel or a compartment included within the fluidic system. The chamber or chambers are operatively connected with one or more fluid channel or passage or space within the fluidic system, but is not initially in fluidic communication with the fluid channel(s) or passage or space. Each of the chamber or chamber may be controllably opened or breached to allow the lowering of the pressure within the fluid channel(s) or passage or space. The lowering of the pressure within the fluid channel(s) or passage or space propels or moves the fluid within the fluid channel or passage or space in a desired direction as is disclosed in detail hereinafter.

Figure 1B:
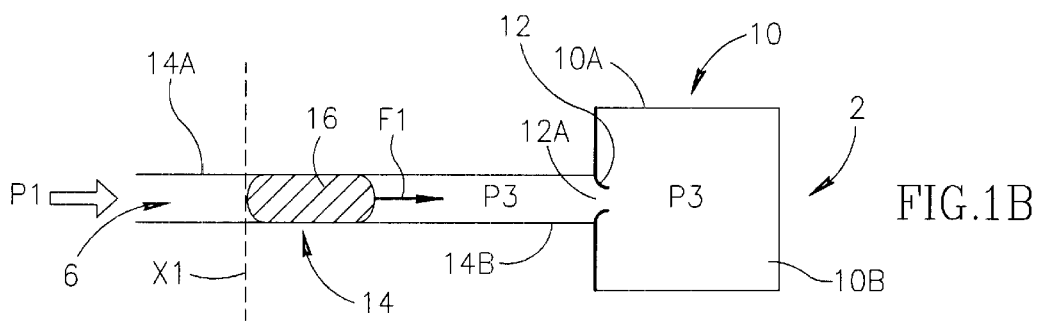
Figure 1C:
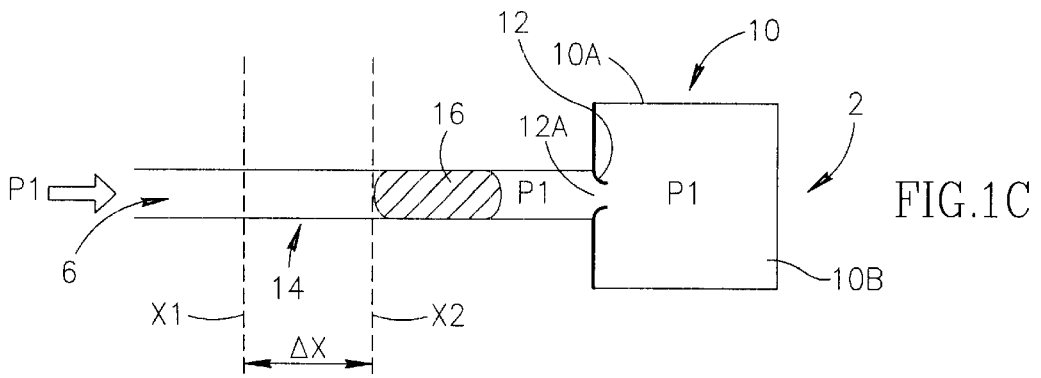

Reference is now made to FIGS. 1A–1C which are schematic diagrams useful in understanding the principles of operation of the methods, devices and systems for propelling fluids of the present invention. FIG. 1 schematically illustrates a device 2 which is a part of a microfluidics system (the entire microfluidics system is not shown in detail for the sake of clarity of illustration).

The device 2 includes an openable closed chamber 10. The openable closed chamber 10 may include chamber walls 10A. The chamber walls 10A define a space 10B enclosed therebetween. Alternatively, the openable closed chamber 10 may be an openable sealed cavity formed within a substrate (not shown) as disclosed in detail hereinafter. The chamber walls 10A may include an openable member 12. The openable member 12 may be an integral breachable or openable part or portion of the chamber walls 10A. The openable member 12 may also be a sealing member (not shown in detail in FIG. 1A) or a sealing layer (not shown in detail in FIG. 1A) which is sealingly attached to a substrate (not shown) having a cavity formed therewithin ( cavity not shown) to form a closed chamber in the substrate as is disclosed in detail hereinafter.

The openable closed chamber 10 may be operatively connected to a flow channel 14. The flow channel 14 may be a discrete hollow tube or conduit or a hollow channel formed within a substrate (not shown), or the like. For example, the chamber 10 and the flow channel 14 may be formed within the same substrate (not shown). In another example, the chamber 10 may be suitably attached to the flow channel 14.

The flow channel 14 may include a drop or a quantity of liquid 16 therein. The liquid 16 divides the flow channel 14 into two portions 14A and 14B. The portion 14A is opened to the external environment outside the device 2 through a suitable port or opening 6 which is in fluidic communication with the environment outside the device 2 or the microfluidics system (not shown) which includes the device 2. The pressure within the portion 14A is equal to the ambient pressure P1. The pressure within the portion 14B of the flow channel 14 is also equal to the ambient pressure P1. The portion 14B is defined between the quantity of fluid 16 and the openable member 12.

In operation, as long as the openable closed chamber 10 remains closed, the pressure P2 within the space 10B is lower than the ambient pressure P1 outside the device 2 and the quantity of liquid 16 is stationary.

Turning to FIG. 1B, when the openable member 12 is opened or breached, an opening 12A is formed in the openable member 12. The opening 12A may be a crack or a passage or a hole, or a number of cracks or passages or holes, or the like, which are formed in the openable member 12. After the openable member 12 is opened, the portion 14B of the flow channel 14 and the space 10B are in fluid communication with each other. The initial pressure P3 within the portion 14B and the space 10B is now lower than the ambient pressure P1. The pressure gradient $\Delta P$ ($\Delta P = P1 - P3$) across the quantity of liquid 16 now exerts a net force F1 schematically represented by the arrow labeled F1 on the quantity of liquid 16. The quantity of liquid 16 will therefore move within the flow channel in the direction of the arrow labeled F1. As the quantity of liquid 16 further moves within the flow channel 14 in the direction of the arrow labeled F1, the pressure gradient ΔP decreases as the pressure within the space 10B increases.

Turning to FIG. 1C, the quantity of liquid 16 stops moving within the flow channel 14 when the pressure within the space 10B is again equal to the ambient pressure P1.

It is noted that the distance ΔX which the quantity of liquid 16 moves along the flow channel 14 between its initial position X1 (FIG. 1A) and its final position X2 (FIG. 1C), depends, inter alia, on the initial value of the pressures P1 and P2, on the initial volume of the portion 14B and on the volume of the space 10B. Thus, the distance ΔX may be controlled by changing, inter alia, one or more of the parameters, such as but not limited to, the initial value of the pressure P2, the initial volume of the portion 14B, and the volume of the space 10B.

It will be appreciated by those skilled in the art, that the moving of a fluid within the device 2 is not limited to the moving of a liquid only and that the opening of the openable closed chamber 10 may also be used to move another type of fluid, such as a quantity of a gas (not shown) or a mixture of gases (not shown) within the device 2 or into the device 2, as is disclosed in detail hereinafter.

It is noted that the openable closed chambers of the present invention are not limited to moving liquids contained within a flow channel but may also be used for drawing a liquid or fluid into a flow channel included within the device.

Figure 2A:
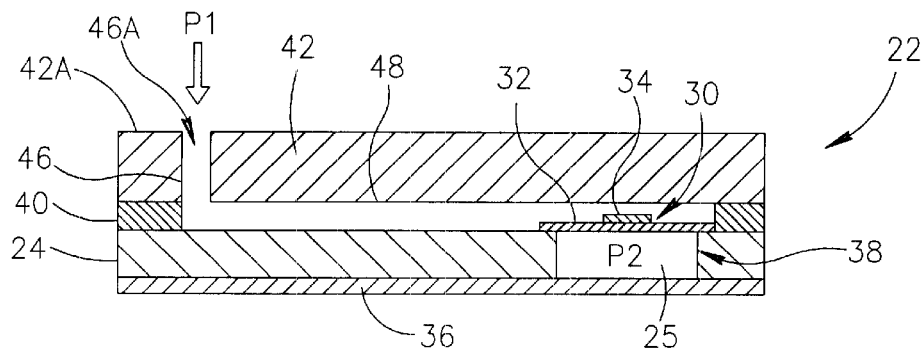
FIGS. 2A–2C are schematic cross-sectional diagrams useful in understanding the principles of operation of a method and devices for introducing a fluid into a fluidics system, in accordance with a preferred embodiment of the present invention.
Figure 2B:
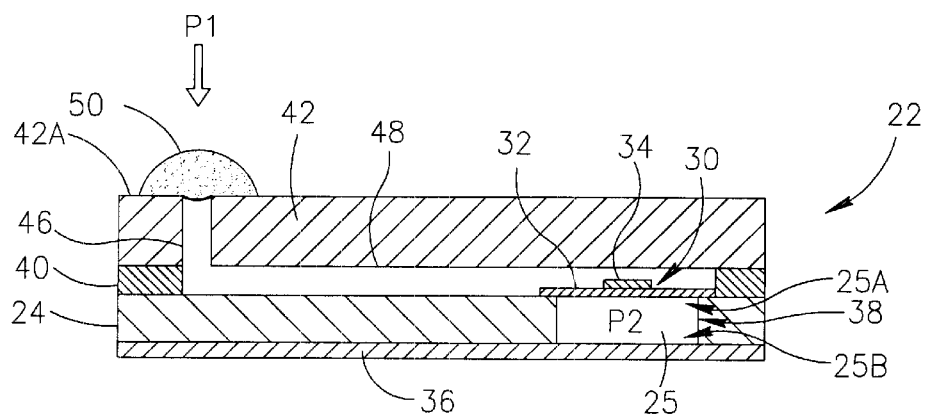
Figure 2C:
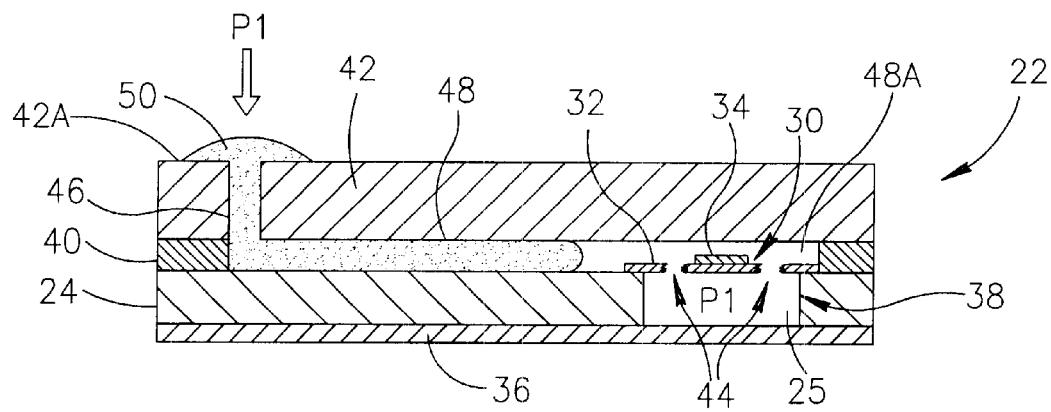

Reference is now made to FIGS. 2A–2C which are schematic cross-sectional diagrams useful in understanding the principles of operation of a method and devices for introducing a fluid into a fluidics system, in accordance with a preferred embodiment of the present invention.

In FIG. 2A, the microfluidics system 22 includes a substrate 24 such as but not limited to a silicon substrate layer, a slab of glass, a slab of plastic material or any other suitable material. The substrate 24 has a hollow passage 25 formed therein. The passage 25 has a first opening 25A and a second opening 25B. The microfluidics system 22 also includes a first openable sealing member 30 sealingly attached to the substrate 24 to seal the first opening 25A thereof. The first openable sealing member 30 includes a sealing layer 32 and a heating element 34 attached to the sealing layer 32. Preferably, the sealing layer is made from a material having low permeability to gasses, such as, but not limited to silicon nitride, a suitable plastic material or any other suitable material. Preferably, the sealing layer 32 may be attached or bonded to the substrate 24 by being deposited upon or formed on the substrate 24 by any suitable deposition or forming method known in the art. Alternatively, the sealing layer 32 may be attached or bonded to the substrate 24 by a suitable glue or adhesive (not shown) or by any other suitable bonding method.

The microfluidics system 22 also includes a second sealing member 36. The second sealing member 36 is sealingly attached or bonded to the substrate 24 to seal the second opening 25B thereof. Preferably, the second sealing member 36 is made from a layer or slab of a material having low permeability to gasses, such as, but not limited to silicon nitride, a suitable plastic material such as for example Kapton®, or any other suitable material. The sealing layer 32 may be attached to the substrate 24 by a suitable glue (not shown) or by any other suitable bonding method.

The sealing of the passage 25 between the openable sealing member 30 and the second sealing member 36 effectively forms an openable closed chamber 38 within the microfluidics system 22. The pressure P2 within the openable closed chamber 38 is lower than the ambient pressure P1 outside the microfluidics system 22.

The microfluidics system 22 also includes a spacer layer 40 suitably attached or glued or bonded to the substrate 24, and a cover layer 42 suitably attached or glued or bonded to the spacer layer 40. The spacer layer 40 and the cover layer 42 may be made from plastic (such as, for example, kapton®), silicon, glass or any other suitable material. The cover layer 42 has an inlet port 46 formed therein. The inlet port 46 comprises a hole or a passage suitably formed within the cover layer 42 and having an opening 46A on the surface 42A of the cover layer 42. A hollow flow channel 48 is thus formed within the microfluidics system 22. The flow channel 48 is in fluidic communication with the inlet port 46, and the pressure within the flow channel 48 is equal to the ambient pressure P1. The heating element 34 of the openable sealing member 30 may be an electrically resistive layer of aluminum or another suitable metal, or another suitable electrically resistive material. The heating element 34 may be operatively connected by suitable electrical conductors (not shown for the sake of clarity of illustration) or wires (not shown) or electrically conducting layers (not shown) to a suitable electrical power source (not shown in FIG. 2A), such as, a battery, an electrochemical chemical cell, a charged capacitor, or any other suitable power source known in the art. When an electrical current flows through the heating element 34, the temperature of the heating element 34 is raised by the power dissipated by the current flowing through the heating element 34. The heating element 34 is thermally coupled to the sealing layer 32. The sealing layer 32 is therefore heated by the heat flowing from the heating element 34. If the sealing layer 32 is made from a brittle or refractory material, such as, but not limited to silicon nitride, or from other materials such as silicon dioxide, silicon carbide, or the like, the heating may result in the development of mechanical stresses within the sealing layer 32. These mechanical stresses may open or breach the sealing member 30 by causing the formation of cracks or openings 44 (best seen in FIG. 2C) in the sealing layer 32.

If the sealing layer 32 is made from a suitable plastic material, such as, but not limited to, Kapton® Mylar®, Polyvinylidene Chloride (PVDC), or from a laminate or composite layer including one or more of these polymers, the heating may result in the melting of parts of the sealing layer 32 or in burning or vaporizing of part of or all of the sealing layer 32. The burning or melting or vaporizing of the sealing layer 32 or of a part thereof may open or breach the sealing member 30 by causing the formation of holes, cracks or openings 44 (best seen in FIG. 2C) in the sealing layer 32.

It is noted that, while the heating element 34 of FIG. 2B is directly in contact with the sealing layer 32, the contact between the heating element 34 and the sealing layer is not obligatory. Thus, one or more additional layers (not shown) may be disposed between the heating element 34 and the sealing layer. Preferably, but not necessarily, the heating element 34 may be thermally coupled to the sealing layer 32 by any layers or structures (not shown) which intervene between the heating element 34 and the sealing layer 32, to ensure heat transfer therebetween. However, the structure and composition of the heating element 34 and the sealing layer 32 may be any suitable structure and composition, as long as the heating of the heating element 34 results in the opening or breaching of the sealing member 30 as disclosed hereinabove, irrespective of the exact mechanism of the opening or breaching.

The breaching or opening of the openable sealing member 30 puts the chamber 38 and the flow channel 48 in fluidic communication with each other.

Turning to FIG. 2B, a drop of liquid 50 may be placed on the surface 42A of the cover layer 42 such that the drop 50 covers the opening 46A of the inlet port 46. Initially, after the placement of the drop 50, the pressure within the flow channel 48 may be nearly equal to the ambient pressure P1 outside the microfluidics system 22 (the pressure within the flow channel 48 need not be identical to the ambient pressure due to capillary forces acting on the liquid).

Turning now to FIG. 2C, when an electrical current is passed through the heating element 34, the sealing member 30 is breached or opened as disclosed in detail hereinabove. The openings 44 formed within the sealing layer 32 of the sealing member 30 allow the pressures within the flow channel 48 and the now open chamber 38 to equalize. The initial pressure within the chamber 38 and the flow channel 48 is lower than the ambient pressure P1. This pressure difference will cause the flow of liquid from the drop 50 into the flow channel 48 of the microfluidics system 22. Some of the liquid from the drop 50 will thus be drawn into the microfluidics system 22.

It is noted that the amount of liquid drawn into the flow channel 48 after the opening of the openable closed chamber 38 may depend, inter alia, on the pressure P2 within the chamber 38 prior to opening (breaching) of the chamber 38, on the volume of air (or other gas or gasses) in the flow channel 48 after placement of the drop 50 on the opening 46A of the inlet port 46, and on the internal volume of the chamber 38. These parameters may be suitably designed to ensure that the desired amount of liquid is drawn into the flow channel 48 or a part thereof. It is noted that these parameters may be designed such that after the opening of the chamber 48, the liquid 50 completely fills the flow channel 48 and may even partially flow into the chamber 38.

Some of the amount of the liquid 50 which is drawn into the flow channel 48 may enter a sample reservoir (not shown in detail in FIGS. 2A–2C) which is constructed as part of the flow channel 48. The liquid in such a sample reservoir (not shown) may be moved into other parts or flow channels within the microfluidics system 22.

It is further noted that while the microfluidics system 22 of FIGS. 2A–2C has a single opening 46A of the inlet port 46, other preferred embodiments of the present invention may have more than one inlet port which may be in fluidic communication with the flow channel 48.

Figure 2D:
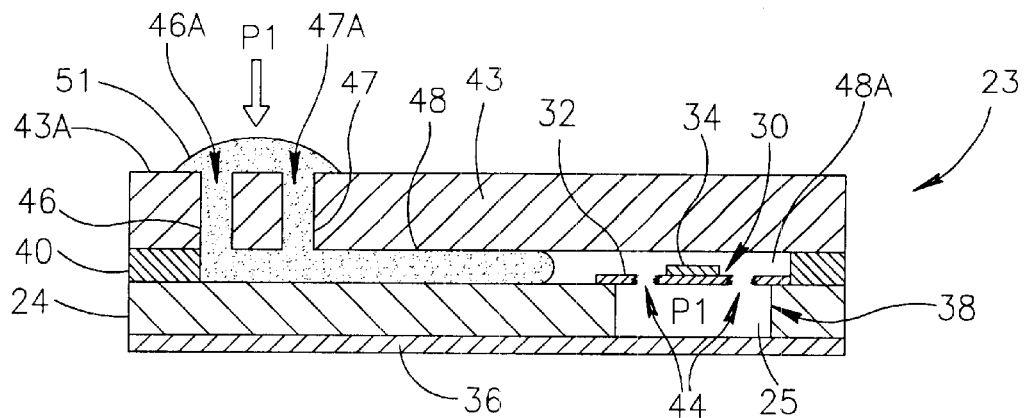
FIG. 2D is a schematic cross-sectional diagram illustrating a fluidics system having multiple inlet ports, in accordance with another preferred embodiment of the present invention.

Reference is now made to FIG. 2D which is a schematic cross-sectional diagram illustrating a fluidics system having multiple inlet ports, in accordance with another preferred embodiment of the present invention. The system 23 of FIG. 2D is similar to the system 22 of FIGS. 2A–2C, except that instead of the cover layer 42 of system 22, the system 23 includes a cover layer 43 having two inlet ports 46 and 47. The cover layer 43 may be made from plastic (such as, for example, Kapton®), silicon, glass or any other suitable material, as disclosed in detail hereinabove. The cover layer 43 of the system 23 has a surface 43A. Each of the inlet ports 46 and 47 opens at the surface 43A. Each of the inlet ports 46 and 47 opens into the flow channel 48 and is in fluidic communication with the flow channel 48. The system 23 is illustrated with the sealing layer 32 in the breached (opened) state, as disclosed hereinabove (see FIG. 2C). A drop of liquid 51 is shown positioned on the surface 43A of the cover layer 43. The drop of liquid 51 sealingly covers the openings 46A and 47A of the inlet ports 46 and 47, respectively. Some of the liquid 51 has been drawn through the inlet ports 46 and 47 into the flow channel 48 after the breaching of the sealing layer 32.

It is noted that, while the fluidics system 23 of FIG. 2D has two inlet ports, other preferred embodiments of the present invention may be constructed, which may have a number of inlet ports greater than two. The advantage of having more than one inlet port in a fluidics system such as, for example, the fluidics system 23 of FIG. 2D, is that even if one of the inlet ports is inadvertently clogged or blocked, the device or the system may still function properly by drawing in or sampling the liquid sample through the inlet port or inlet ports that remain open.

Figure 3:
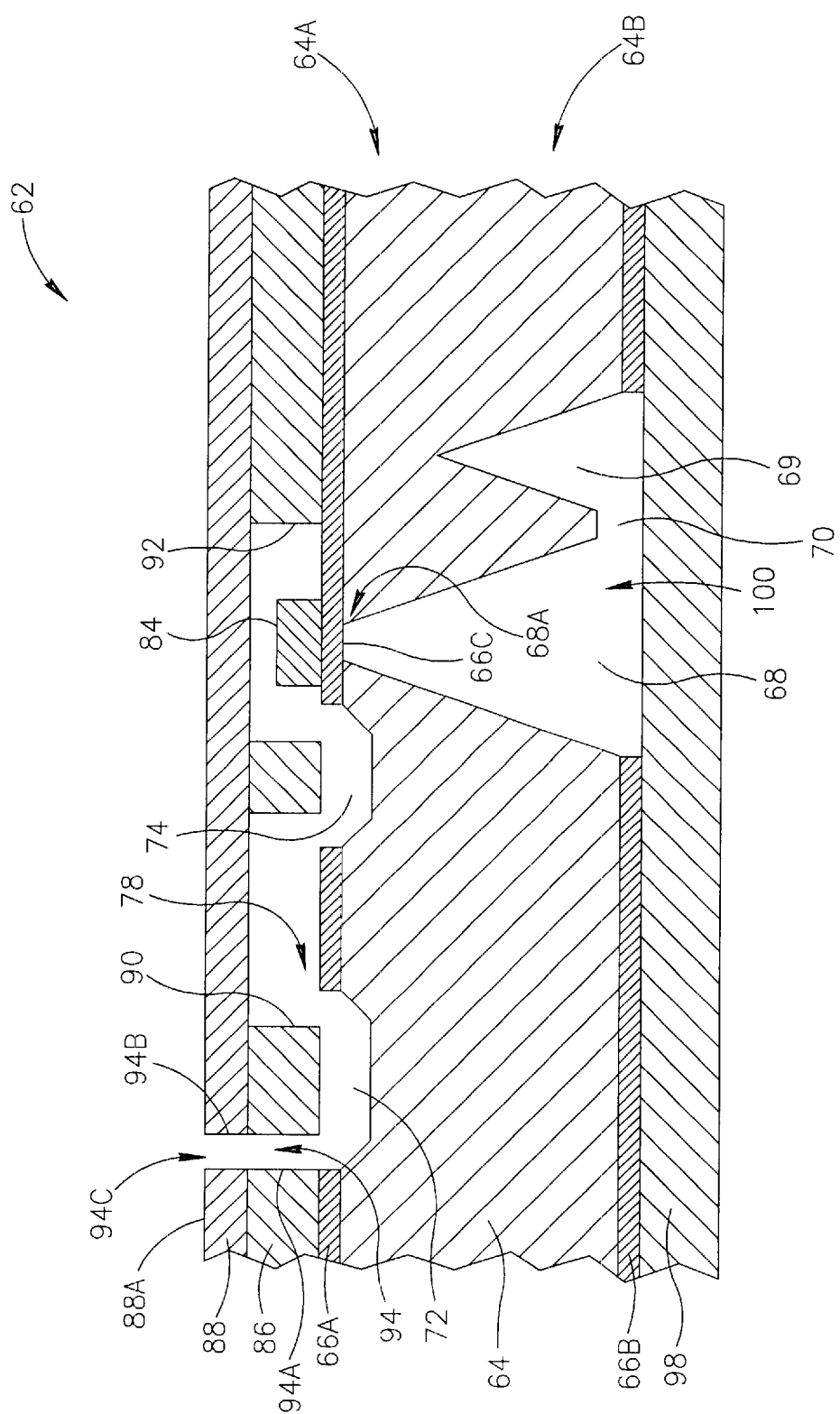
FIG. 3 is a schematic cross-sectional diagram of a part of a microfluidics system including a device for moving a fluid into a microfluidics system, in accordance with a preferred embodiment of the present invention.

Reference is now made to FIG. 3 which is a schematic cross-sectional diagram of a part of a microfluidics system including a device for moving a fluid into a microfluidics system, in accordance with a preferred embodiment of the present invention. The device 62 of FIG. 3 is formed using a silicon wafer 64 having a wafer diameter of approximately 4 inches and a wafer thickness of approximately 0.5 millimeters. The silicon wafer had a first side 64B and an second side 64A. Two layers of pad oxide (which are not shown for the sake of clarity of illustration) were grown on both sides of the silicon wafer 64 using standard oxidation techniques. Two layers 66A and 66B of silicon nitride having a thickness of approximately 1200 angstrom were grown on the pad-oxide layers of the silicon wafer 64 using standard low pressure chemical vapor deposition (LPCVD). Two chambers 68 and 69 were formed in the silicon wafer using. Initially, the chamber 68 had the form of a truncated pyramid like cavity having a rectangular shaped base of approximately 700×700 microns, and the chamber 69 had the form of a pyramid like cavity having a rectangular shaped base of approximately 660×660 microns. The portion 66C of the silicon nitride layer overlying the truncated end 68A of the chamber 68, serves as a first sealing member to seal the end 68A of the chamber 68.

The silicon nitride layers 66A and 66B were covered with layers of a suitable photo-resist. The silicon nitride layer 66B was then suitably patterned by using a suitable photo-resist and a suitable mask, developing the photo-resist layers, and removing the unprotected portions of the silicon nitride layer 66B in a reactive ion etch (RIE) chamber. The photo-resist layers were then stripped. The cavities for forming the chambers 68 and 69 were then formed by subjecting the silicon wafer 64 to a wet KOH etch step at 95° C.

The silicon nitride layers 66A and 66B were then coated with a suitable photo-resist. The silicon nitride layer 66A was then patterned by applying a suitable photo-resist to the silicon nitride layer 66A, patterning with another suitable mask, and developing the photo-resist. The unprotected portions of the silicon nitride layer 66A were then removed in a RIE chamber.

The silicon nitride layers 66A and 66B, and the surface of the silicon exposed in the region where portions of the silicon nitride layer 66B were previously removed to form the cavities for forming the chambers 68 and 69, were then covered with a suitable photo-resist, the silicon nitride layer 66B was then patterned with another suitable mask, and the photo-resist was developed. The unprotected portions of the silicon nitride layer 66B overlying the region in which the channel 70 is to be formed were then removed in a RIE chamber. The photo-resist layers were then stripped, and the channels 70, and 72 and 74 were then formed using a wet KOH etch step at 95° C.

The purpose of the channel 70 is to interconnect the chambers 68 and 69 such that after completion of the device 22, the chambers 68 and 69 are in fluidic communication with each other. The channels 72 and 74 form portions of a flow channel 78 of the device 62.

A heating element 84 and the electrical conductors (not shown in the cross-section of FIG. 3) electrically connected thereto are then formed by depositing a layer of aluminum (not shown in its entirety) having a thickness of approximately 1 micron over the entire surface of the side 64A of the silicon wafer 64, coating the aluminum layer with a photo-resist, patterning the photo-resist layer with a suitable mask, developing the photo-resist layer, and etching the unprotected aluminum layer with a suitable aluminum etchant, to form the heating element 84 and electrical conductors (not shown in FIG. 3) connected thereto. The resist layer was then stripped.

A first Kapton® layer 86 was then bonded to the side 64A of the silicon wafer 64. A suitably shaped layer of Pyralux® LF coverlay, commercially available as product code LF 7001 from Dupont Electronic Materials, U.S.A, was punched in a mechanical punch to form suitably dimensioned holes 90, 92 and 94A therein. The Pyralux® LF coverlay is a composite Kapton® polyimide film coated on one side with B-staged modified acrylic adhesive. The protective layer (not shown) covering the acrylic adhesive coated side of the resulting punched Pyralux® LF coverlay Kapton® layer 86 was peeled and discarded, and the acrylic adhesive coated side of the first Kapton® layer 86 was aligned and put in contact with the surface of the side 64A of the silicon wafer 64. The first Kapton® layer 86 was bonded to the silicon nitride layer 66A under slight pressure in a bonder by heating to 155° C. for 2 hours.

A second Kapton® layer 88 of Pyralux® LF coverlay, commercially available as product code LF 7001 from Dupont Electronic Materials, U.S.A, was punched in a mechanical punch to form a suitably dimensioned hole 94B therein. The second Kapton® layer 88 was then bonded to the first layer. The protective layer (not shown) covering the acrylic adhesive coated side of the resulting punched Pyralux® LF coverlay layer 88 was peeled and discarded, and the acrylic adhesive coated side of the second Kapton® layer 88 was aligned and put in contact with the surface of the side 64A of the silicon wafer 64. The second Kapton® layer 88 was bonded to the first Kapton® layer 86 under slight pressure in a bonder by heating the wafer 64 and the first and second Kapton® layers 86 and 88, respectively, to 155° C. for 2 hours.

After the bonding of the Kapton® layers 86 and 88, the holes 94A and 94B together form an inlet port 94 having an opening 94C formed in the surface 88A of the second Kapton® layer 88. The channel 78 is a hollow channel which is in fluidic communication with the outside of the device 62 through the opening 94C of the inlet port 94.

The chamber 68 is sealed on its end 68A by the portion 66C of the silicon nitride layer 66 which overlies the end 68A of the chamber 68. The next stage in constructing the device 62 is the bonding of a second sealing layer 98 to form an openable closed chamber 100 within the device 62. The second sealing layer 98 is bonded under vacuum to the silicon nitride layer 66B. The partially constructed device 62 is introduced into a vacuum chamber (not shown) of a modified bonding device (not shown) including a controllable hot plate (not shown).

The second Kapton® layer 88 is put in contact with the hot plate and the silicon nitride layer 66B faces upwards. A third Kapton® layer comprising Pyralux® LF coverlay, commercially available as product code LF 0130 from Dupont Electronic Materials, U.S.A, having a thickness of approximately 100 microns is used to form the second sealing member 98. The protective layer (not shown) covering the acrylic adhesive coated side of the Pyralux® LF coverlay layer product code LF 0130 was peeled and discarded, and the acrylic adhesive coated side of the third Kapton® layer was put in contact with the surface of the silicon nitride layer 66B of the silicon wafer 64. A suitably flat metal plate (not shown) was placed on the third Kapton® layer to flatten the third Kapton® layer and to ensure proper contact between the third Kapton® layer and the silicon nitride layer 66B.

The vacuum chamber was evacuated to maintain a typical pressure of $1.2 \times 10^{-1}$ Torricelli (Torr). The third Kapton®) layer was bonded to the silicon nitride layer 66B of the silicon wafer 64 by heating the wafer 64 and the layers 86, 88 and 98 to 155° C. for 2 hours under vacuum.

After bonding is completed, the device 62 includes an openable closed chamber 100. The openable closed chamber 10 comprises the chambers 68 and 69 and the channel 70 which fluidically connects the chambers 68 and 69.

The pressure within the closed chamber 100 is lower than the ambient atmospheric pressure in the typical environment in which the device 62 is adapted to be used (which is the ambient atmospheric pressure in the environment surrounding the device 62). The chamber 68 and 69 are in fluidic communication with each other through the channel 70.

Figure 4:
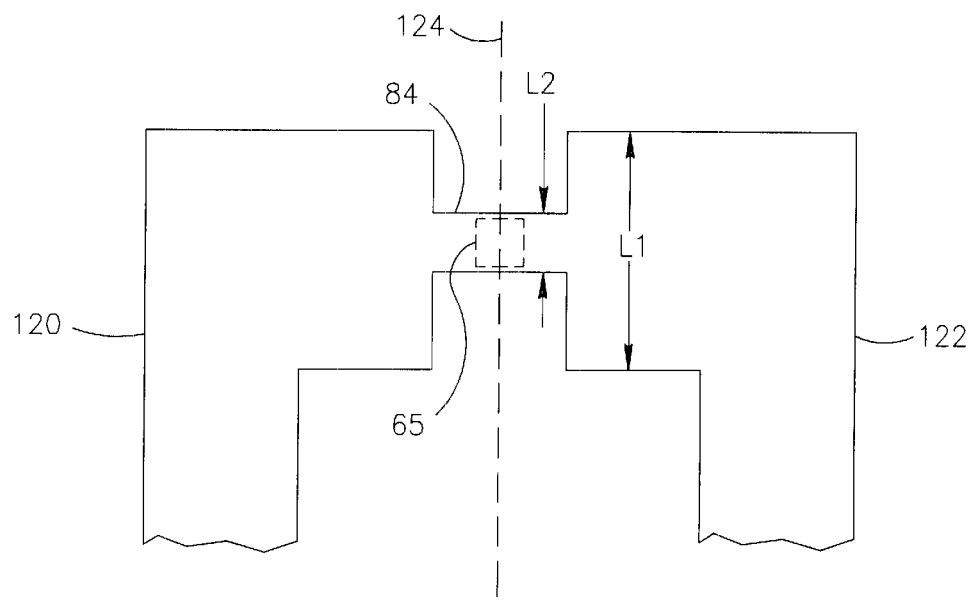
FIG. 4 is a schematic top view of part of the device of FIG. 3 illustrating the details of the heating element illustrated in FIG. 3.

Reference is now made to FIG. 4 which is a schematic top view of part of the device of FIG. 3 illustrating in the details of the heating element 84.

FIG. 4 illustrates a top view of part of the device 62 of FIG. 3 with the Kapton® layers 86 and 88 removed. The members 120 and 122 represent electrically conducting aluminum electrodes which are contiguous with the heating element 84 (seen in the cross-sectional view of FIG. 3). The dashed line 124 schematically represents the line along which the cross-sectional view of FIG. 3 is taken. The electrically conducting members 120 and 122 are relatively larger than the heating element 84. Thus, the resistance of the heating element 84 to the flow of current is higher than the resistance of the member 120 and 122. When an electrical current of suitable amplitude is passed through the conducting members 120 and 122 and through the heating element 84, the higher resistance of the heating element 84 causes a higher power dissipation at the heating element 84 than in the conducting members 120 and 122, leading to the preferential heating of the region of the heating element 84. In the device illustrated in FIGS. 3 and 4 the width L1 of the conducting elements 120 and 122 is approximately 400 microns, and the width L2 of the heating element 84 is approximately 40 microns. The dashed line 65 of FIG. 4 represents the contours of the chamber at the end 68A of the chamber 68 as viewed from above. If the current is high enough, the heating element 84 may reach a temperature which is sufficiently high to open or breach the portion 66C of the silicon nitride layer 66A which overlies the end 68A of the chamber 68 (not shown in FIG. 4) by forming openings or cracks therein.

In experiments, a drop of water (not shown) dyed with an organic dye was placed on the surface 88A (FIG. 3) of the Kapton® layer 88, such that the drop of water completely covered the opening 94C of the inlet port 94 (FIG. 3). The entire device 62 was visually observed under a microscope while a voltage difference of approximately 5 volts was applied to the members 120 and 122 through suitably conducting wires (not shown) which were electrically connected to the members 120 and 122. The colored water was visually observed to be drawn into the flow channel 78 of the device 62. The Kapton® layer 88 was translucent enough to allow the visual observation of the entry of the dyed water into the channel 78.

It is noted that while the device 62 was constructed using Kapton® for implementing the layers 86, 88 and 98, and silicon nitride to implement the layer 66A, many other suitable materials or composite materials may be used to construct these layers. For example, the second sealing layer 98 may be made from glass, silicon, boron nitride, a gas impermeable polymer material such as, but not limited to various polyimides, or multi-layers composite plastic materials (laminated layers) having suitable gas impermeability properties combined with suitable strength, workability and mechanical properties.

It is noted that for long shelf life of the device 62, it is preferred to form the sealing layers, such as the layers 98 and 66A from materials or material combinations which are suitable for forming a good, gas-tight seal with the layers to which they are bonded, and which are sufficiently impermeable to gases over the intended shelf life of the device 62 or other devices of the present invention. The selection of such materials for implementation of the layers 98 and 66A will reduce the leakage of gas into the evacuated or partially evacuated openable closed chambers, such as but not limited to the openable closed chamber 100 of FIG. 3 to extend the useful shelf-life of the devices of the present invention.

Similarly, while the use of a silicon substrate such as the silicon wafer 64 of FIG. 3 to implement the devices or micro-fluidic systems of the present invention, is advantageous due to the fact that it allows the use of well known and well controlled silicon machining processes, other types of materials and machining processes may be used to implement various components of the devices of the present invention, such as, but not limited to the device 62 of FIG. 3. For example, the heating element 84 may be formed from other metals having suitable electrical resistivity, such as but not limited to copper or another electrically conducting metal, or from polysilicon, or from any other suitable electrically conducting material having a suitable resistivity.

It is further noted that the machining or processing of the various components and layers of the devices of the present invention, such as but not limited to the device 62 of FIG. 3 are not limited to the machining or processing methods disclosed hereinabove. Other processing methods may be used such as but not limited to molding or casting or spin-casting of various plastic components, laser ablation methods and or laser drilling methods of various components or layers to form various cavities or passages therewithin, and other lithographic methods for forming or shaping the various components of the devices of the present invention. Other fabrication methods such as, for example suitable lamination methods may also be used for forming the devices and systems of the present invention or for forming parts thereof.

Similarly, the bonding or gluing of layers to other layers or substrates of the devices of the present invention are not limited to the bonding or gluing or sealing methods disclosed hereinabove for the device 62 of FIG. 3, and any other suitable bonding methods, gluing methods, or sealing methods known in the art may be used in implementing the devices of the present invention.

It will be appreciated by those skilled in the art that may different variations and modifications of the devices and methods of the present invention may be made which would be included within the scope and spirit of the present invention.

For example, while only one openable closed chamber is illustrated in the devices 2 and 22 of the present invention, many chambers or chamber groups may also be used in the devices of the present invention.

Figure 5:
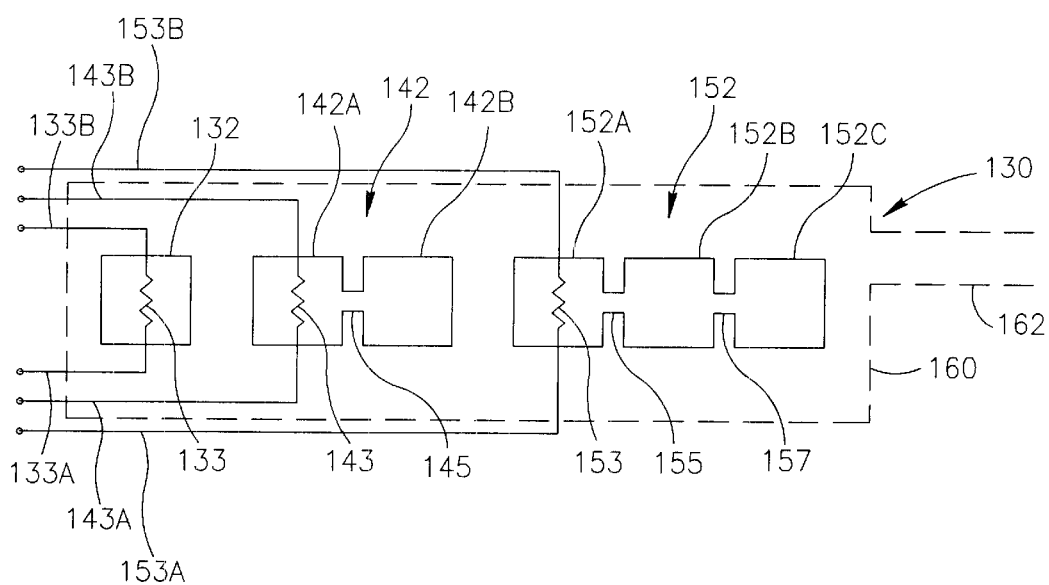
FIG. 5 is a schematic diagram illustrating part of a microfluidics device having a plurality of chamber groups, in accordance with another preferred embodiment of the present invention.

Reference is now made to FIG. 5 which is a schematic diagram illustrating part of a microfluidics device having a plurality of chamber groups, in accordance with a preferred embodiment of the present invention. The microfluidics device 130 includes a plurality of openable closed chambers. A first openable chamber 132 comprises a single sealed cavity (shown only schematically in the top view of FIG. 5) having therein a pressure lower than the ambient pressure as disclosed hereinabove. The sealing member (not shown in detail) of the chamber 132 may be opened by a suitable heating element 133, constructed similarly to the heating element 84 (FIG. 4) as disclosed in detail hereinabove. The heating element 133 is electrically connected to suitable electrical conducting members 133A and 133B, which may be constructed and operative similar to the members 120 and 122 of FIG. 3. The electrical conducting members 133A and 133B may be used to open or breach the sealing member (not shown) of the openable chamber 132 as disclosed in detail hereinabove.

A second chamber group 142 includes a first openable chamber 142A and a second chamber 142B which is in fluidic communication with the first openable chamber 142A through a channel 145. The volume of the second chamber group 142 is slightly larger than twice the volume of the openable chamber 132 due to the addition of the volume of the channel 145. The pressure within the chamber group 142 is lower than the ambient pressure as disclosed hereinabove. The sealing member (not shown in detail) of the openable chamber 142A may be opened by a suitable heating element 143, constructed similarly to the heating element 84 as disclosed in detail hereinabove. The heating element 143 is electrically connected to suitable electrical conducting members 143A and 143B, which may be constructed and operative similar to the members 120 and 122 of FIG. 3. The electrical conducting members 143A and 143B may be used to open or breach the sealing member (not shown) of the openable chamber 142A as disclosed in detail hereinabove.

A third chamber group 152 includes a first openable chamber 152A, a second chamber 152B which is in fluidic communication with the first openable chamber 152A through a channel 155, and a third chamber 152C which is in fluidic communication with the chamber 152B through a channel 157. Thus, all the chambers 152A, 152B and 152C are in fluidic communication with each other. The volume of the third chamber group 152 is larger than three times the volume of the openable chamber 132 due to the addition of the volume of the channels 145 and 147. The sealing member (not shown in detail) of the openable chamber 152A may be opened by a suitable heating element 153, constructed similarly to the heating element 84 as disclosed in detail hereinabove. The heating element 153 is electrically connected to suitable electrical conducting members 153A and 153B, which may be constructed and operative similar to the members 120 and 122 of FIG. 3. The electrical conducting members 153A and 153B may be used to open or breach the sealing member (not shown) of the openable chamber 152A as disclosed in detail hereinabove. The pressure within the chamber group 152 is lower than the ambient pressure as disclosed hereinabove.

The openable chambers 132, 142A and 152A are constructed such that upon opening of their respective sealing members (not shown in detail) the chambers 132, 142A and 152A, respectively are in fluidic communication with a common channel 160 (represented schematically by the dashed line labeled 160). Thus, by opening a selected chamber of a specific chamber group, or a selected combination of chamber groups, the amount and/or the rate of flow of a fluid into the common channel 160, or alternatively within or into a flow channel 162 which is in fluidic communication with the common channel may be controlled.

It is noted that for the sake of clarity of illustration the heating elements 133, 143 and 153 of FIG. 5 are schematically represented by resistor symbols and the conducting members 133A, 133B, 143A, 143B, 153A and 153B are schematically represented as lines. In an actual implementation of a device the heating elements 133, 143 and 153 and the conducting members 133A, 133B, 143A, 143B, 153A and 153B may be implemented similarly (but not necessarily identically) to the implementation of the heating element 84 and the conducting members 120 and 122 of FIG. 4 or suitable modifications thereof, or by any other suitable method known in the art for producing resistive elements and electrical conductors which are operatively electrically connected thereto.

Thus, each of the openable chamber 132 and the openable chamber groups 142 and 152 may be individually and controllably opened or breached to control the movement of a fluid into the device 130 or within the device 130, as disclosed hereinabove. If the openable chamber 132 is opened, a first amount of fluid may be drawn into the device 130 of FIG. 5, such as for example through a suitable inlet port (not shown) in fluidic communication with the flow channel 162. If the openable chamber group 142 is opened, a second amount of fluid larger than the first amount of fluid may be drawn into the device 130. If the openable chamber group 152 is opened, a third amount of fluid larger than the second amount of fluid may be drawn into the device 130. Similarly, The distance of moving a quantity or volume of fluid (not shown) disposed within the flow channel 162 or within a reservoir (not shown) which is in fluidic communication with the flow channel 162, may be controlled by the chamber group or chamber groups, which are opened. For example, if the openable chamber 132 and the chamber group 152 are simultaneously opened, the amount of fluid (not shown) moved into the device 130 such as for example through a suitable inlet port (not shown) in fluidic communication with the flow channel 162 may be larger than the amount of fluid moved into the device 130 when the chamber group 152 is opened.

Additionally, different combination of the openable chamber 132 and the chamber groups may be sequentially opened. Such sequential opening may be advantageous for performing a priming step for initially filling a reservoir (not shown) or a flow channel (nor shown) or the like, with a first amount of liquid (or gas), and then moving a second amount of the liquid (or gas) from the reservoir into another flow channel (not shown) or reaction chamber (not shown) integrated within the device 130.

It is noted that while the device 130 of FIG. 5 includes three individually openable chambers and chamber groups, other preferred embodiments of the invention may be implemented using any other suitable number and layout of chamber's and chamber groups.

The chambers 132, 142A, 142B, 152A, 152B and 152C have similar dimensions. Thus, the arrangement of the chambers and chamber groups of the exemplary embodiment illustrated in FIG. 5 has the advantage that it may be simple to design and implement due to the uniform dimensions of the chambers included in the different chamber groups. The uniformity of the chamber dimension may facilitate the layout of the chambers in the design stage.

However, other implementations of the devices of the present invention may include openable closed chambers having different dimensions within the same device.

Figure 6:
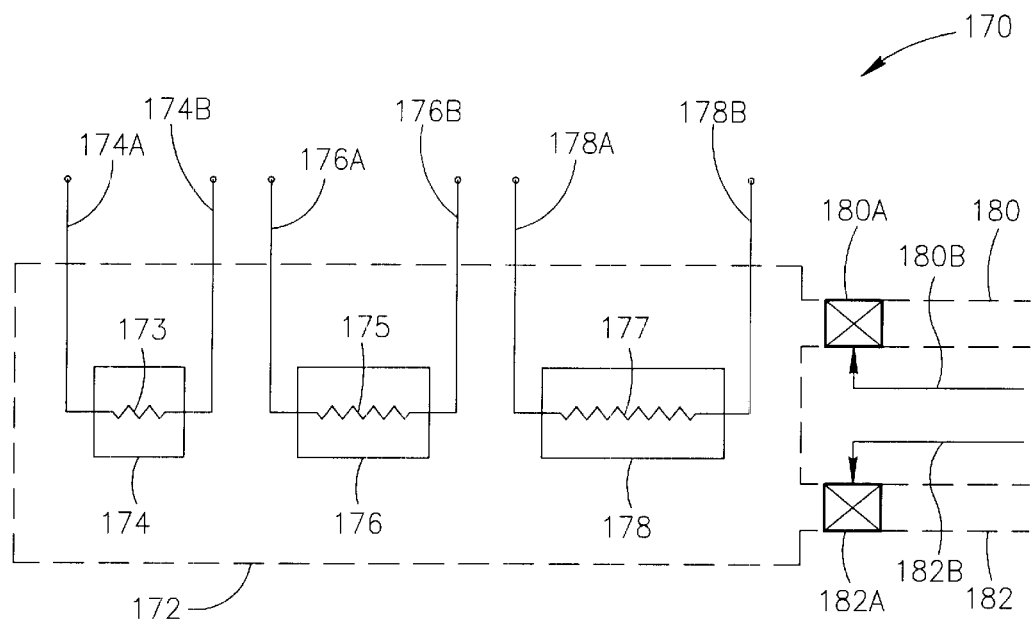
FIG. 6 is a schematic diagram illustrating part of a fluidic device having a plurality of openable closed chambers having different dimensions, in accordance with another preferred embodiment of the present invention.

FIG. 6 is a schematic diagram illustrating part of a fluidic device having a plurality of openable closed chambers having different dimensions, in accordance with another preferred embodiment of the present invention.

The device 170 includes, inter alia, a common chamber 172 schematically represented by the dashed line labeled 172. The device 170 also includes three openable closed chambers 174, 176 and 178. The openable closed chambers 174, 176 and 178 may be constructed similar to the openable closed chamber 100 of FIG. 3. For the sake of clarity of illustration, the sealing layers of the openable closed chambers 174, 176 and 178 are not shown in detail in FIG. 6, but may be constructed similarly to the layer 66A of the device 62 of FIG. 3 with suitable adaptations if required, or by any others suitable method for constructing an openable or breachable sealing layer or sealing member disclosed herein or known in the art.

Each of the openable closed chambers 174, 176 and 178 has a different volume. The volume of the openable closed chamber 178 is larger than the volume of the openable closed chamber 176. The volume of the openable closed chamber 176 is larger than the volume of the openable closed chamber 174. The pressure within each of the openable closed chambers 174, 176 and 178 is lower than the ambient pressure outside the device 170.

The device 170 further includes heating elements 173, 175 and 177. The heating elements 173, 175 and 177 are schematically represented by the resistor symbols labeled by reference numerals 173, 175 and 177 and their structure is not shown in detail. The heating element 173 is suitably electrically connected to conducting members 174A and 174B. The heating element 175 is suitably electrically connected to conducting members 175A and 175B. The heating element 177 is suitably electrically connected to conducting members 177A and 177B.

The common chamber 172 and the openable closed chambers 174, 176 and 178 are constructed such that after opening of the chamber 174, the chamber 174 is in fluidic communication with the common channel 172. Similarly, after opening of the chamber 176, the chamber 176 is in fluidic communication with the common channel 172, and after opening of the chamber 178, the chamber 178 is in fluidic communication with the common channel 172.

The device 170 further includes two flow channels 180 and 182. The flow channel 180 has a controllable valve 180A therein. The controllable valve 180A is suitably operatively connected to a control line 180B. The flow channel 182 has a controllable valve 182A therein. The controllable valve 182A is suitably operatively connected to a control line 182B. Each of the controllable valves 180A and 182A may be individually controllably closed or opened. The valve 180A may be closed or opened by sending a suitable control signal through the control line 180B. The valve 182A may be closed or opened by sending a suitable control signal through the control line 182B. The control lines 180B and 182B may be metallic or other suitable electrically conducting members. The control signals may be a voltage signal having a first level for opening the valve 180A or the valve 182A and a second voltage level for closing the valve 180A or the valve 1892A. However, other types of controllable valves, and control signals, which are known in the microfluidics art may be used to implement the valves 180A and 182A. It is noted that while the valves 180A and 182A may be controllable reusable valves which may be controllably switched between an open state and a closed state, the valves 180A and 182A may also be openable closed valves of a "one shot" type which are closed and may be controllably opened once only. For example, the valves 180A and 182A may be implemented as "one shot" valves having an openable sealing member (not shown).

The controlling of valves 180A and 182A may enable the fluidic connecting of the flow channel 180, or the flow channel 182 or both of the flow channels 180 and 182 to the common chamber 172, such that the common chamber 172 is in fluidic communication with the flow channel 180, or with the flow channel 182, or with both of the flow channels 180 and 182, respectively.

Similarly, the controlling of valves 180A and 182A may enable the fluidic disconnecting (fluidic uncoupling) of the flow channel 180, or the flow channel 182 or both of the flow channels 180 and 182 from the common chamber 172, such that the common chamber 172 is in fluidically disconnected from the flow channel 180, or from the flow channel 182, or from both of the flow channels 180 and 182, respectively.

In operation, when the pressure within the flow channel 180 needs to be reduced for performing the moving of a fluid (not shown) into or within the device 170, as disclosed in detail hereinabove, the valve 182 may be closed and the valve 180 may be opened. Any selected chamber or selected chamber combination of the chambers 174, 176 and 178 may then be opened, by suitably opening or breaching the sealing members (not shown) of the selected chamber or selected chambers, as disclosed in detail hereinabove. After the fluid was moved as desired, the valve 180A may be closed to fluidically disconnect the flow channel 180 from the common chamber 172. If another fluidic operation is then needed, for example if a fluid (not shown) needs to be moved into a reaction chamber (not shown) which is in fluidic communication with the flow channel 182 included in the device 172, the valve 182A may now be opened (while keeping the valve 180A closed) and one or more of the chambers 174, 176 and 178 which have not been previously opened or breached is now opened to reduce the pressure within the common chamber and within the flow channel 182 which is in fluidic communication therewith, to perform the desired fluidic operation of moving the fluid into the reaction chamber (not shown) which is in fluidic communication with the flow channel 182.

It is noted that while only three openable closed chambers 174, 176 and 178 are provided in the device 170 of FIG. 6, other preferred embodiments of the invention may include a different number of chambers (not shown). The number of chambers included in the device may be larger or smaller than three chambers, depending, inter alia, on the number of fluidic operations required, and on the desired degree of freedom of selecting the number of chambers to be opened.

It is further noted that, while the non-limiting example disclosed hereinabove demonstrates the performing of two sequential fluidic operations (the drawing of a liquid into the device 170, followed by the moving of another liquid into a reaction chamber), It is also possible to perform two or more fluidic operations simultaneously using the device 170 of FIG. 6. For example, the valves 180A and 180B may be simultaneously opened to put both of the flow channels 180 and 182 in fluidic communication with the common chamber 172 and one or more of the chambers 174, 176 and 178 may be opened to simultaneously draw a liquid (not shown) into the device 170, and draw another liquid (not shown) into a reaction chamber (not shown) fluidically connected to the flow channel 182.

It is still further noted that while only two flow channels 180 and 182 are shown as fluidically connectable to the common chamber 172 of the device 170 of FIG. 6, the device 170 may be modified to include a plurality of additional flow channels (not shown) for enabling additional fluidic operation to be simultaneously or sequentially performed. Such an implementation may require additional valves (not shown) for fluidically connecting or fluidically disconnecting various flow channels to or from the common chamber 172, and for (optionally) fluidically connecting or fluidically disconnecting one or more of the plurality of flow channels (not shown) to selected fluidic spaces (not shown) or other fluidic compartments (not shown) included in the device 172.

It will be appreciated by those skilled in the art that the arrangements and configurations of the openable closed chambers of the present invention is not limited to the examples illustrated in FIGS. 1–6. For example, while the linear arrangement of the chambers 152A and 152B within the chamber group 152 of FIG. 5 and the linear alignment of the chambers 174, 176 and 178 within the device 170 of FIG. 6 may be preferred due to, inter alia, considerations of design simplicity and various manufacturing considerations, other preferred embodiments of the openable closed chambers of the present invention may use other suitable non-linear arrangements of the chambers within a device or non-linear alignment of fluidically communicating chambers within a chamber group.

Figure 7:
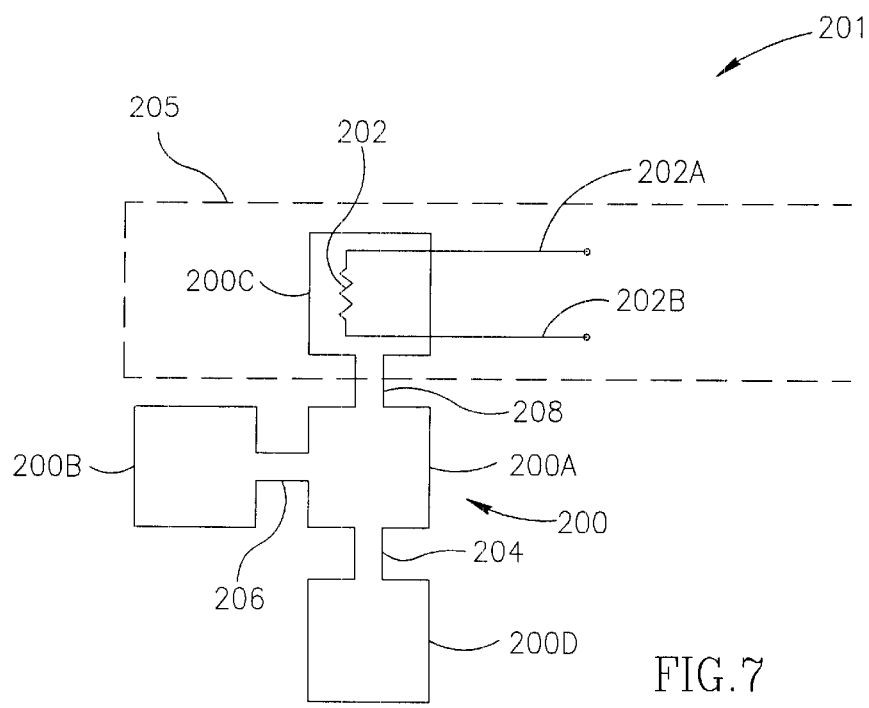
FIG. 7 is a schematic top view of part of a non-linearly arranged chamber group, which may be used within a fluidic device, in accordance with another preferred embodiment of the present invention.

Reference is now made to FIG. 7 which is a schematic top view of part of a non-linearly arranged chamber group, which may be used within a fluidic device in accordance with another preferred embodiment of the present invention.

The chamber group 200 is included in or integrated within a fluidic device 201 (only part of the device 201 is illustrated in FIG. 7). The chamber group 200 includes a central chamber 200A, and three peripheral chambers 200B, 200C and 200D surrounding the central chamber 200A. The chamber 200B is in fluidic communication with the central chamber 200A through a channel 206. The chamber 200D is in fluidic communication with the central chamber 200A through a channel 204. The chamber 200C is in fluidic communication with the central chamber 200A through a channel 208. The chamber 200C is an openable closed chamber having a openable sealing member (not shown in FIG. 7 for the sake of clarity of illustration) and a heating element 202. The heating element may be operatively electrically connected to conducting members 202A and 202B which may be used to controllably open the chamber 202C by suitably heating the heating element 202 in accordance with any of the opening or breaching methods disclosed in detail hereinabove. When the sealing member (not shown) of the chamber 202C is opened, the chamber 202C and the chambers 200A, 200B and 200D connected thereto are in fluidic communication with a common channel 205. The common channel 205 (viewed from above ) is schematically represented by the dashed line labeled with reference numeral 205. The chamber group 200 is thus an openable closed chamber. When the chamber group 202 is closed, the pressure within the chamber group 202 is lower than the ambient pressure outside the device 201, as is disclosed in detail hereinabove.

Additional openable chambers (not shown) or chamber groups (not shown) may (optionally) be disposed near the common channel 205 such that they may also be controllably put in fluidic communication with the common channel 205 similarly to the chamber group 200.

It is noted that, the volumes of the chambers 200A, 200B, 200C, and 200D may be approximately the same. However, in accordance with other preferred embodiment of the present invention, the volumes and/or the shapes of the chambers 200A, 200B, 200C, and 200D of the chamber group 200 need not be the same, and that some of the chambers 200A, 200B, 200C, and 200D may have a different volume and/or shape than the remaining chambers of the chamber group 200.

It is noted that many other geometrical chamber arrangements within a chamber group are possible, which are considered within the scope of the present invention.

It is noted that when an openable closed chambers comprising a chamber group such as the openable closed chamber 100 of FIG. 3 or the chamber group 152 of FIG. 5 or the chamber group 200 of FIG. 7, are opened, it is obligatory that the sealing member or the sealing layer of the openable chamber included within the chamber group is opened or breached. For example, to open the chamber group 152 of FIG. 5, the sealing member (not shown) overlying the openable chamber 152A must be opened or breached by the heating of the heating element 153. If the openable chamber 152A fails to open, the chamber group 152 will not be in fluidic communication with the common channel 160, and the pressure in the common channel 160 will not be reduced, aborting or leading to a failure of the moving of the fluid into or within the device 130.

It is further noted that FIGS. 5, 6 and 7 are schematic and diagrammatic, and that the various schematic contours of the various chambers or chamber groups illustrated in FIGS. 5, 6 and 7 do not represent the actual dimensions or the accurate forms of the chambers or chamber groups or of the channels which connect different chambers within a chamber group, rather the outlines schematically illustrate the number of the chambers present, and the fluidic connectivity of different chambers within a chamber group. Thus, unless it is specifically stated that the volume of specific chambers are equal, the volumes of those chambers may or may not be equal.

While proper design and implementation of the openable closed chambers of the present invention may reduce the rate of device failure to an acceptable level, it may be desirable to design the openable closed chambers of the devices of the present invention to minimize the probability of device failure.

Figure 8:
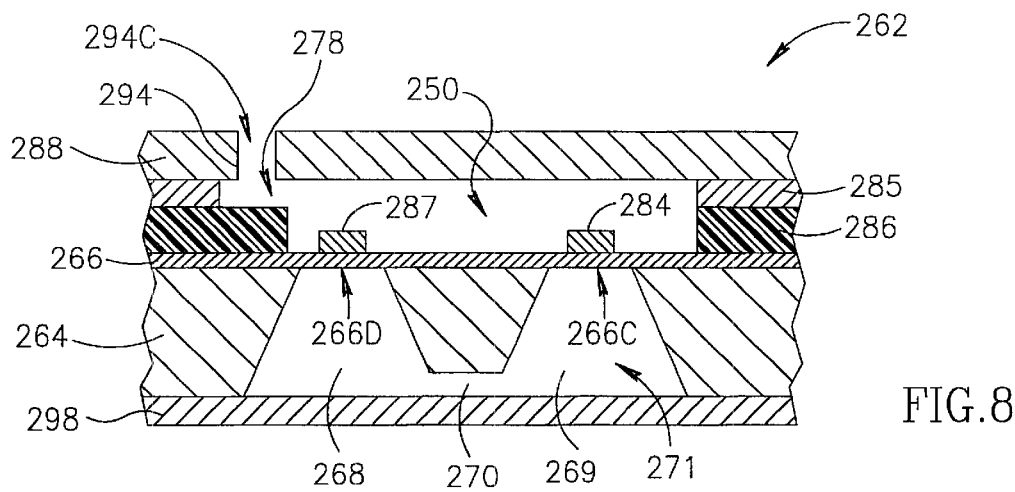
FIG. 8 is a schematic diagram illustrating a cross sectional view of part of a microfluidics system including an openable closed chamber group having multiple openable sealing members.

Reference is now made to FIG. 8 which is a schematic diagram illustrating a cross sectional view of part of a microfluidics system including an openable closed chamber group having multiple openable sealing members.

The device 262 includes two openable chambers 268 and 269 formed within a substrate layer 264, such as but not limited to a suitable silicon substrate. The openable chambers 268 and 269 are in fluidic communication with each other through a channel 270. A first sealing layer 266 seals the chambers 268 and 269 from above. The first sealing layer 266 is suitably bonded to the substrate 264 as disclosed in detail hereinabove. A second sealing layer 298 seals the chambers 268 and 269 from below, The second sealing layer 298 may be a Kapton® layer similar to the second sealing layer 98 of FIG. 3 and may be suitably bonded to the substrate 264 as disclosed in detail hereinabove. However, the second sealing layer 298 may also be made from another suitable material or materials and may be bonded or glued or otherwise sealingly attached to the substrate 264, using any suitable bonding methods and bonding materials known in the art. A suitable heating element 284 comprising a layer of aluminum or another suitable electrically resistive material is attached to or deposited on or bonded to the portion 266C of the first sealing layer 266 overlying the chamber 269, as disclosed in detail hereinabove. A second suitable heating element 287 comprising a layer of aluminum or another suitable electrically resistive material is attached to, or deposited on, or bonded to the portion 266D of the first sealing layer 266 overlying the chamber 268, as disclosed in detail hereinabove. Each of the heating elements 284 and 287 is suitably connected to suitable electrically conducting members (not shown in the cross-sectional view of FIG. 8). The heating elements 284 and 287 may be used to breach or open the portions 266C and 266D, respectively, of the first sealing layer 266. A first patterned spacer layer 286 is suitably bonded to the first sealing layer 266. A second patterned spacer layer 285 is suitably bonded to the first spacer layer 286. A cover layer 288 having an upper surface 288A is suitably bonded to the second spacer layer 285.

The first sealing layer 266, the first spacer layer 286, the second spacer layer 285, the cover layer 288, and the second sealing layer 298 may be Kapton® layers constructed and bonded as disclosed in detail hereinabove, or may be formed from any other suitable material or materials, as disclosed hereinabove.

The first sealing layer 266, the first and the second spacer layers 286 and 285, respectively, and the cover layer 288, define therebetween a common chamber 250, and a flow channel 278 in communication with the common chamber 250. The common chamber 250 and the flow channel 278 are in fluidic communication with an inlet port 294. The inlet port 294 is in fluidic communication with the environment outside of the device 262 through an opening 294C at the end of the inlet port 294. The opening 294C opens at the surface 288A of the cover layer 288.

When it is desired to move a liquid (not shown in FIG. 8) disposed on the surface 288A and covering the opening 294C, into the device 262, or to move a liquid (not shown in FIG. 8) disposed within the flow channel 278 or a portion thereof, the chambers 268 and 269 may both be simultaneously opened by suitably passing suitable electrical currents through the heating elements 284 and 287 to open or breach the portions 266C and 266D, respectively of the first sealing layer 266. Similarly, if it is desired to move a volume of a gas or a gas mixture into the device 262, or to move a gas or a gas mixture (not shown in FIG. 8) disposed within the flow channel 278 or a portion thereof, the chambers 268 and 269 may both be simultaneously opened by suitably passing suitable electrical currents through the heating elements 284 and 287 to open or breach the portions 266C and 266D, respectively of the first sealing layer 266.

It is noted that even if only one of the portions 266C and 266D is opened or breached, this is sufficient to ensure that the chambers 268 and 269 are put in fluidic communication with the common chamber 250, leading to a successful completion of the reduction of the pressure within the common chamber 250 and the required moving of the fluid (not shown).

This has the advantage of increasing the probability of opening of the openable chamber group 271 which includes the chambers 268 and 269 and the channel 270, beyond the probability of separately opening of a single chamber selected from the chamber 268 and 269. For example, if the probability $P_1$ of failure of opening of one of the chambers 268 or 269 by passing a suitable current through the heating element 287 or 284, respectively is $P_1$=0.01, the probability $P_2$ of failure of opening of the chamber group 271 when the same currents are passed simultaneously through both of the heating elements 287 and 284 is $P_2$=0.01×0.01=0.0001. Such a decrease in the probability opening failure may be advantageous since, among others, it may allow the relaxation of manufacturing tolerances, which may improve the yield of acceptable devices and may lower the manufacturing cost of a single device.

It is noted that, while the device 262 of FIG. 8 includes only two openable chamber 268 and 269 within the openable chamber group 271, other preferred embodiments (not shown in detail) of the invention may include a higher number of openable chambers within openable chamber group or groups included in the fluidic device, to decrease the probability of failure to open an openable chamber group to a desired or an acceptable level.

It will be appreciated that the methods which may be used for opening the openable closed chambers of the invention are not limited to methods using the heating elements disclosed in detail hereinabove. Other methods which may be used for opening of the openable closed chambers of the invention may include various different mechanical opening methods.

It will be appreciated by those skilled in the art that while the openable closed chamber 100 of FIG. 3, and the openable closed chambers 174, 176 and 178 of FIG. 6 are constructed to be opened using the heating elements 84, and 173 175 and 177, respectively, as disclosed in detail hereinabove, the openable closed chambers 100, 174, 176 and 178 may also be constructed using other suitable openable closed chamber configurations which may be opened by using other methods for opening the openable closed chambers as disclosed in detail hereinabove and hereinafter.

Figure 9A:
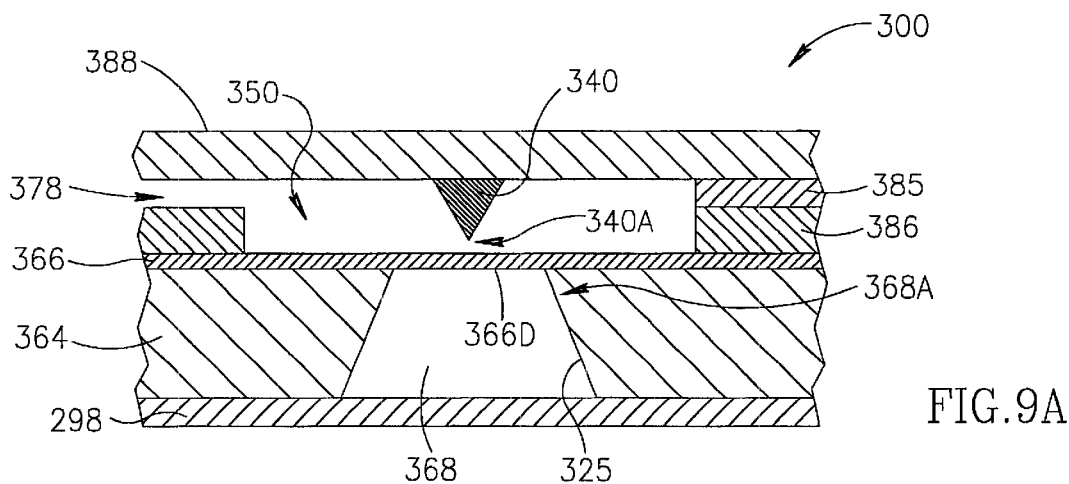
FIG. 9A is a schematic cross sectional view of part of a fluidic device including a mechanical opening member for opening an openable closed chamber, in accordance with yet another preferred embodiment of the present invention.

Reference is now made to FIG. 9A which is a schematic cross sectional view of part of a fluidic device including a mechanical opening member for opening an openable closed chamber, in accordance with yet another preferred embodiment of the present invention.

The device 300 includes a substrate 364 having a passage 325 formed therein. The substrate 364 may be a silicon substrate or may be any other suitable substrate such as a suitable polymer substrate, a glass substrate, or any other suitable substrate known in the art or disclosed hereinabove, The device further includes a first sealing layer 366 sealingly attached or bonded to the substrate 364. The device further includes a second sealing layer 398 sealingly attached or bonded to the substrate 364. An openable closed chamber 368 is thus formed by the passage 325 sealed by the first sealing layer 366 and the second sealing layer 298 (similar to the second sealing layer 298 of FIG. 8) The device 300 further includes two spacer layers 385 and 386, and a cover layer 388. The first spacer layer 386 may be suitably and sealingly attached or bonded to the first sealing layer 366. The second spacer layer 385 may be suitably sealingly bonded to the first spacer layer 386. The cover layer 388 may be suitably sealingly bonded to the second spacer layer 385.

The first sealing layer 366, the first spacer layer 386, the second spacer layer 385, the cover layer 388, and the second sealing layer 298 may be Kapton® layers constructed and bonded as disclosed in detail hereinabove, or may be formed from any other suitable material or materials, as disclosed hereinabove.

The first sealing layer 366, the first spacer layer 386, the second spacer layer 385 and the cover layer 388 define therebetween a chamber 350. The chamber 350 is in fluidic communication with a flow channel 378. The flow channel 378 may be suitably connected to other fluidic spaces (not shown) or fluidic components (not shown) of the device 300, such as for example, reaction chambers (not shown) or sample chambers (not shown) or reagent reservoirs (not shown), or the like. An opening member 340 is suitably attached to or bonded to, or deposited on, or formed from the cover layer 388. Preferably, the opening member 340 is disposed or positioned above the portion 366D of the sealing layer 366 which overlies the end 368A of the chamber 368. The opening member 340 may be shaped as a conical member or a tapering member or a pyramid-like member. However, other suitable forms of an opening member suitable for opening or breaching the first sealing layer 366 may also be used. The opening member 340 may have a tip 340A. The tip 340A may or may not be in contact with the first sealing layer 366. Preferably, the cover layer 388 is made from a material or materials which have a degree of flexibility that is sufficient to allow the mechanical bending or curving of part of the cover layer 388 when force is applied to a portion of the cover layer 388 which overlies the opening member 340. The application of force may be performed by pressing a finger on a marked area (not shown) of the cover layer 388 or by using a suitable object such as a suitable stylus (not shown), a tip of a pencil (not shown) or the like, to apply force to the cover layer 388 which is sufficient to push the opening member 340 against the first sealing member 366 to open the closed chamber 368 by suitably breaking, or cracking, or otherwise breaching or open the first sealing layer 366 or by forming one or more openings (not shown in FIG. 9A) in the portion 366D of the first sealing layer which overlies the end 368A of the chamber 368. Preferably, the opening member 340 is made from a hard substance such as, but not limited to boron nitride, silicon nitride, or the like. However, the opening member 340 may also be formed as an integral part of the cover layer 388 (not shown in FIG. 9A) which may be coated or covered by depositing a layer of hard material (not shown) thereupon.

It is noted that while the opening member 340 of FIG. 9A is attached or bonded to the cover layer 388 of the device 300, this is not obligatory and other implementations of the present invention may be constructed and used in which an opening member is not attached to the cover layer 388.

Figure 9B:
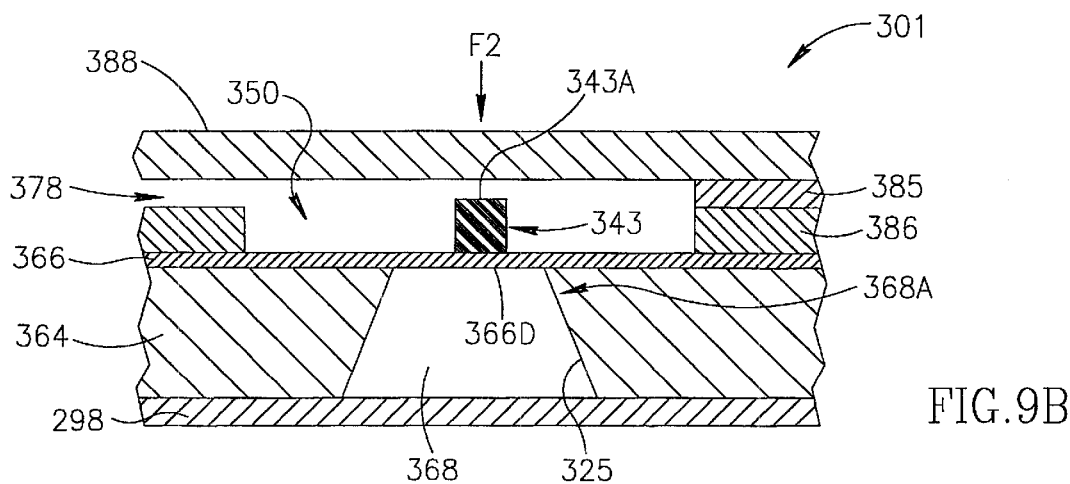
FIG. 9B is a schematic cross sectional view of part of a fluidic device including a mechanical opening member attached to a sealing member of an openable closed chamber, in accordance with still another preferred embodiment of the present invention.

Reference is now made to FIG. 9B which is a schematic cross sectional view of part of a fluidic device including a mechanical opening member attached to a sealing member of an openable closed chamber, in accordance with still another preferred embodiment of the present invention. The device 301 of FIG. 9B is similar in structure to the device 300 of FIG. 9A, except that instead of the opening member 340, the device 301 includes an opening member 343, which is attached to, or bonded to, or formed on the first sealing layer 366. The opening member 343 may be a suitably shaped member attached to or deposited on or bonded to the first sealing layer 366. For example, the opening member 343 may be made from SU8 photoresist commercially available from MicroChem Corp. Mass., U.S.A, or any other suitable material having a sufficient mechanical strength. In accordance with one preferred embodiment of the present invention, the opening member 343 may be formed on the second sealing layer 366 prior to the bonding of the spacer layer 386 to the first sealing layer 366. The first sealing layer 366 may be coated with a layer of SU8 photo-resist (not shown). The SU8 photo-resist may be then Patterned using a suitable mask, and developed to form the opening member 343. The opening member 343 may have any suitable desired cross section in a plane (not shown) parallel to the first sealing layer 366. For example, the cross section of the opening member 343 in a plane parallel to the first sealing layer 366 may be, square, rectangular, circular, ellipsoidal, or may have any other suitable cross-sectional shape.

After the forming of the opening member 343 is completed, the bonding of the spacer layers 386 and 385, and the cover layer 388, and the sealing of the chamber 368 by the second sealing layer 298 may be completed as disclosed in detail hereinabove for the device 300 of FIG. 9A.

In operation, the openable closed chamber 368 may be opened by suitably pressing on or applying a force F2 to the surface of the cover layer 388 which overlies the opening member 343. The force F2 may cause the cover layer 388 to bend until it pushes against the end 343A of the opening member 343, The force F2 should be sufficient to cause the portion 366D of the first sealing layer 366 to crack or break or otherwise open, such that the openable closed chamber 368 is opened or breached. The advantage of the preferred embodiment of FIG. 9B is that it may be easier and/or simpler (and therefore less costly) to manufacture the opening member 343 on the first sealing layer 366 as disclosed hereinabove by using standard lithographic patterning methods known in the art, than to form the opening member 340 of FIG. 9A on the cover layer 388.

It is noted that while the opening member 340 of the device 300 of FIG. 9A is manually moved to open the openable closed chamber 368, other non-manual opening methods may be also used for controllably opening one or more openable closed chambers included in other preferred embodiments of the present invention.

Figure 10:
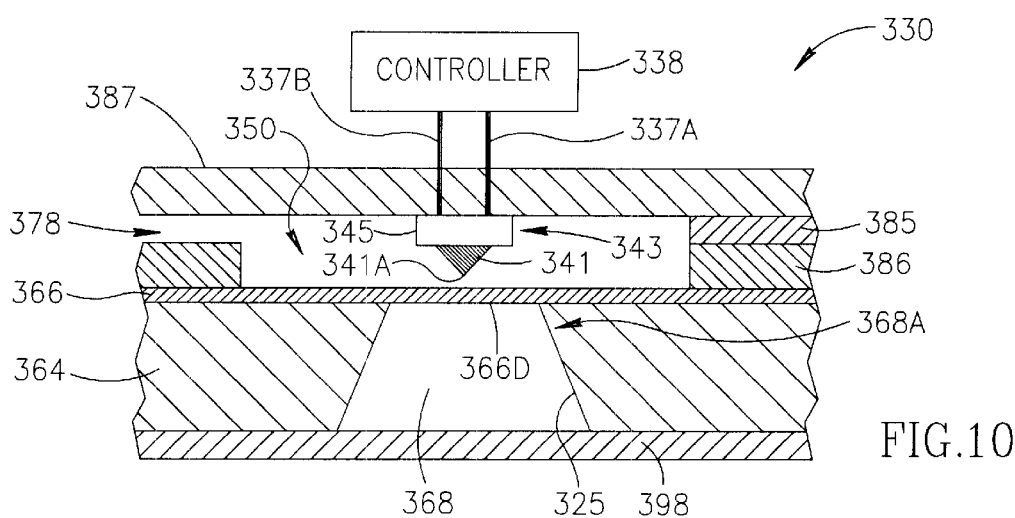
FIG. 10 is a schematic part cross-sectional, part functional block diagram, illustrating part of a microfluidics device including an openable closed chamber and an actuator driven opening mechanism for opening the closed chamber, in accordance with a preferred embodiment of the present invention.

Reference is now made to FIG. 10 which is a schematic part cross-sectional part functional block diagram, illustrating part of a microfluidics device including an openable closed chamber and an actuator driven opening mechanism for opening the closed chamber, in accordance with a preferred embodiment of the present invention. The device 330 includes a substrate 364 having a passage 325 formed therein. The substrate 364 may be a silicon substrate or may be any other suitable substrate such as a suitable polymer substrate, a glass substrate, or any other suitable substrate known in the art or disclosed hereinabove, The device 330 further includes a first sealing layer 366 sealingly attached or bonded to the substrate 364. The device 330 further includes a second sealing layer 398 sealingly attached or bonded to the substrate 364, as disclosed in detail hereinabove with respect to the second sealing layer 298 and the substrate 264 of FIG. 8. The second sealing layer 398 may be similar to the second sealing layer 298 of FIGS. 8, 9A and 9B. An openable closed chamber 368 is thus formed by the passage 325 sealed by the first sealing layer 366 and the second sealing layer 398. The device 300 further includes two spacer layers 385 and 386, and a cover layer 387. The first spacer layer 386 may be suitably and sealingly attached or bonded to the first sealing layer 366. The second spacer layer 385 may be suitably sealingly bonded to the first spacer layer 386. The cover layer 387 may be suitably sealingly bonded to the second spacer layer 385.

The first sealing layer 366, the first spacer layer 386, the second spacer layer 385, the cover layer 387, and the second sealing layer 398 may be Kapton® layers constructed and bonded as disclosed in detail hereinabove, or may be formed from any other suitable material or materials, as disclosed hereinabove.

The first sealing layer 366, the first spacer layer 386, the second spacer layer 385 and the cover layer 387 define therebetween a chamber 350. The chamber 350 is in fluidic communication with a flow channel 378. The flow channel 378 may be suitably connected to other fluidic spaces (not shown) or fluidic components (not shown) of the device 330, such as for example, reaction chambers (not shown) or sample chambers (not shown) or reagent reservoirs (not shown), or the like. The device 330 further includes an opening mechanism 343. The opening mechanism 343 is a controllable opening mechanism. The opening mechanism 343 may include an actuator 345. The actuator 345 is suitably attached to or bonded to, or deposited on, or otherwise suitably coupled to an opening member 341. Preferably, the opening member 341 is disposed or positioned above the portion 366D of the sealing layer 366 which overlies the end 368A of the chamber 368. The opening member 341 may be shaped as a conical member or a tapering member or a pyramid-like member, or the like. However, other suitable forms of the opening member 341 suitable for opening or breaching the first sealing layer 366 may also be used.

The opening member 341 may have a tip 341A. The tip 341A may or may not be in contact with the first sealing layer 366. The actuator 345 may be any suitable actuator capable of moving the opening member 341 in contact with the portion 366D of the sealing layer 366 (in the case in which the opening member 341 in not initially in contact with the portion 366D of the sealing layer 366), and to push the opening member 341 against the portion 366D of the sealing member 366 with a force sufficient to open or break or breach the sealing member 366 or the portion 366D thereof to effectively open the chamber 368 to put the chamber 368 in fluidic communication with the chamber 350. For example, the actuator 345 may be a piezoelectric actuator including one or more piezoelectric elements (not shown in detail).

The piezoelectric element or elements (not shown) of the actuator 345 may be suitably connected to a controller 338 through a pair of electrically conducting members 337A and 337B. The controller 338 may include an electrical power source (not shown) or may be suitably connected to an electrical power source (the power source and the connections are not shown for the sake of clarity of illustration). In a preferred embodiment in which that the actuator 345 is a piezoelectric actuator, the controller 338 may controllably apply a voltage difference across the piezoelectric element (s) of the actuator 345, using the conducting members 337A and 337B, to push the opening member 341 against the portion 366D of the sealing member 366 with a force sufficient to open or break or breach the sealing member 366 or the portion 366D thereof to effectively open the chamber 368 to put the chamber 368 in fluidic communication with the chamber 350.

In accordance with other preferred embodiments of the present invention, the actuator 345 may be any other type of suitable actuator, such as but not limited to, an electromechanical actuator (such as, for example, a micro-solenoid activated actuator), hydraulic micro-actuators, pneumatic micro-actuators, or any other suitable type of actuator or micro-actuator which is known in the art.

Preferably, the cover layer 387 is made from a material or materials such as, for example, glass, silicon, or the like, which have a suitable degree of mechanical rigidity that is sufficient to allow proper opening of the chamber 368 without excessive bending of the cover layer 387. Preferably, the opening member 341 is made from a hard substance such as, but not limited to boron nitride, silicon nitride, or the like. However, the opening member 341 may also be an integral part of the actuator 345. For example, if the actuator 345 comprises a piezoelectric element or crystal, the opening member 341 may be a suitably shaped portion of the piezoelectric element or crystal.

Figure 11:
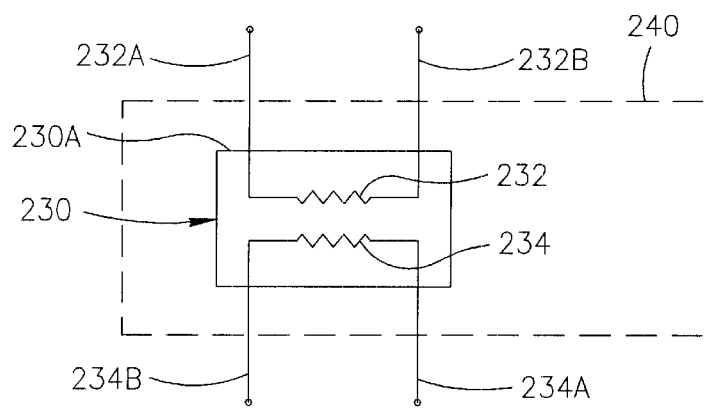
FIG. 11 is a schematic part diagram illustrating the arrangement of heating elements on an openable closed chamber having two heating elements, in accordance with a preferred embodiment of the present invention.

Reference is now made to FIG. 11 which is a schematic part diagram illustrating the arrangement of heating elements on an openable closed chamber having two heating elements, in accordance with a preferred embodiment of the present invention. An openable closed chamber 230 has two heating elements 232 and 234 attached to a sealing layer (the top layer is not shown in the top view of FIG. 11) the contour line 230A circumscribe the cavity of the chamber 230 as seen from above through the sealing layer. The heating element 232 is electrically connected to conducting members 232A and 232B. The heating element 234 is electrically connected to conducting members 234A and 234B. It is noted that the heating elements 232 and 234 and the conducting member 232A, 232B, 234A, and 234B are only schematically and symbolically drawn in FIG. 11. The actual shape of the heating element 232 and of the conducting members 232A, 232B, may be similar to the shape of the heating element 84 and the conducting members 120 and 122, or may be a modification thereof. The actual shape of the heating element 234 and of the conducting members 234A, 234B, may be similar to the shape of the heating element 84 and the conducting members 120 and 122, or may be a modification thereof.

Figure 12:
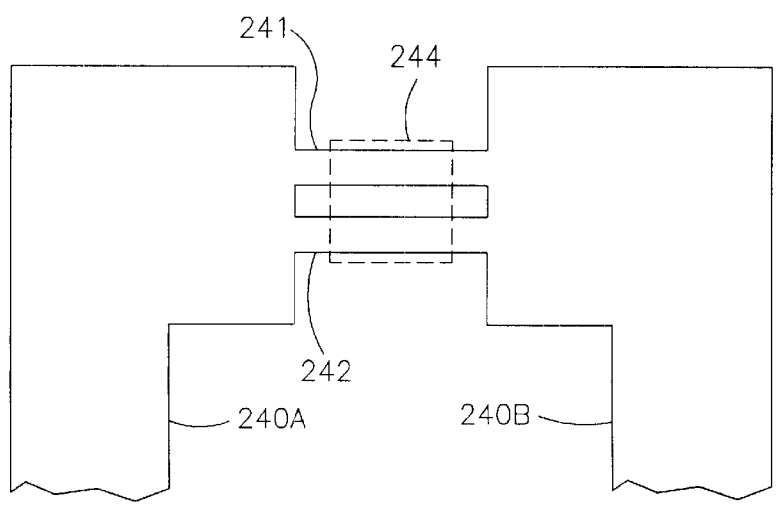
FIG. 12 is a schematic diagram illustrating a top view of two heating elements having a common pair of electrically conducting members, useful in opening an openable closed chamber, in accordance with a preferred embodiment of the present invention.

Reference is now made to FIG. 12 which is a schematic diagram illustrating a top view of two heating elements having a common pair of electrically conducting members and useful is opening an openable closed chamber, in accordance with a preferred embodiment of the present invention. The heating elements 241 and 242 are formed as an integral part of a patterned layer comprising an electrically conducting material, such as for example, aluminum, or another suitable metal or electrically conducting substance, as disclosed hereinabove for the heating element 84 of FIGS. 34. A pair of electrically conducting members 240A and 240B are contiguous with the heating elements 241 and 242. Preferably, the heating elements 241 and 242 and the conducting members 240A and 240B are formed from the same layer of conductive material by suitable patterning of the layer. The dashed line 244 indicates the borders of a cavity in an openable closed chamber as viewed from above. A sealing layer which is interposed between the heating elements and the cavity 244 is not shown in the top view. This sealing layer (not shown) may be similar in construction and operation to the sealing layer 66A of FIG. 3 and to the sealing layer 266 of FIG. 8.

The advantage of the configuration of heating element 232 and 234 (FIG. 11) is that, the probability of a failure in opening the sealing layer of the single openable closed chamber 230 when two such heating elements are simultaneously heated is lower than the probability of failure in opening the sealing layer when only one of the heating elements 232 and 234 is heated.

The advantage of the configuration of heating elements 241 and 242 (of FIG. 12) is that even in a case in which one of the heating elements 241 and 242 is defective or inoperative, and cannot be heated due to a break therein or another manufacturing problem, the remaining heating element may still function effectively to open the closed chamber schematically delineated by the dashed line labeled 244.

Figure 13A:
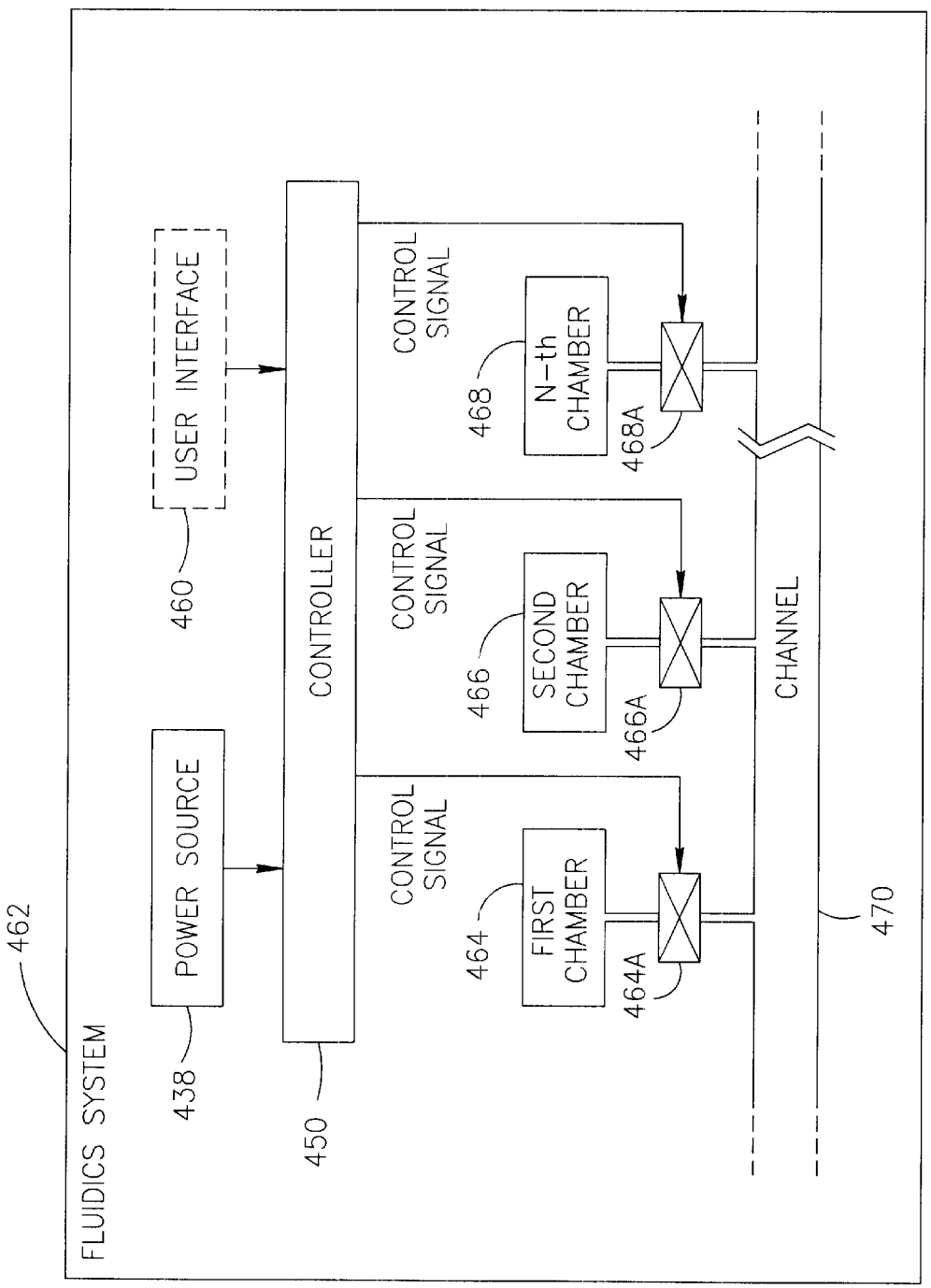
FIGS. 13A–13B are schematic diagrams illustrating two different fluidics systems including a controller, a power source and a plurality of controllably openable closed chambers, in accordance with additional preferred embodiments of the present invention.
Figure 13B:
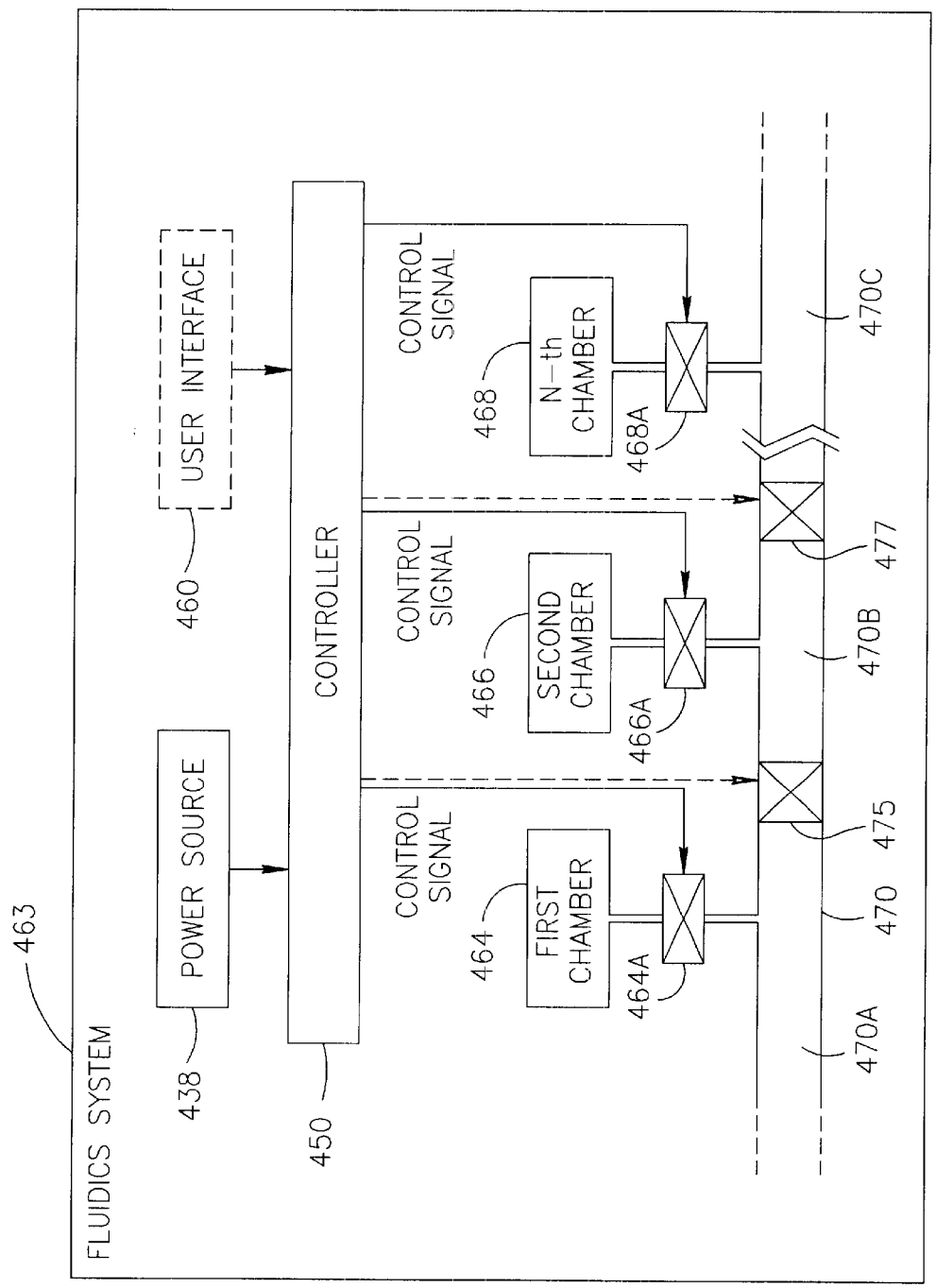

Reference is now made to FIGS. 13A–13B which are schematic diagrams illustrating two different fluidics systems including a controller, a power source and a plurality of controllably openable closed chambers, in accordance with additional preferred embodiments of the present invention. Turning to FIG. 13A, The fluidics system 462 includes a plurality of N openable closed chambers 464, 466 and 468. The first chamber is labeled by reference numeral 464, the second chamber is labeled by reference numeral 466 and the N-th chamber is labeled by reference numeral 468. The fluidics system 462 also includes a channel 470. The channel 470 may be a flow channel or a common channel or common compartment of the fluidics system 462. The channel 470 may be in fluidic communication with one or more flow channels (not shown), reservoirs (not shown), reaction chambers (not shown), or other fluidic components known in the art. The chamber 464 is not in fluidic communication with the common channel 470 prior to it's opening. The openable closed chamber 464 may be opened or breached by a suitable opening mechanism 464A. Once the openable closed chamber 464 is opened, the chamber 464 is in fluidic communication with the channel 470 so that a fluid, such as a gas or a liquid may flow between the channel 470 and the chamber 464.

The chamber 466 is not in fluidic communication with the common channel 470 prior to it's opening. The openable closed chamber 466 may be opened or breached by a suitable opening mechanism 466A. Once the openable closed chamber 466 is opened, the chamber 466 is in fluidic communication with the channel 470 so that a fluid, such as a gas or a liquid may flow between the channel 470 and the chamber 466.

The chamber 468 is not in fluidic communication with the common channel 470 prior to it's opening. The openable closed chamber 468 may be opened or breached by a suitable opening mechanism 468A. once the openable closed chamber 468 is opened, the chamber 468 is in fluidic communication with the channel 470 so that a fluid, such as a gas or a liquid may flow between the channel 470 and the chamber 468.

The opening mechanisms 464A, 466A and 468A may be any suitable opening mechanism, such as, but not limited to the controllable opening mechanisms disclosed hereinabove and illustrated in FIGS. 2A–2C. 3–8, and 10–11, however, the opening mechanisms 464A, 466A and 468A may also be any other suitable opening mechanism known in the art and adapted for breaking or opening a sealing member such as a sealing membrane or sealing layer.

The fluidics system 462 further includes a controller 450 for controlling the opening of the chambers 464, 466 and 468. The controller 450 is suitably electrically connected to a power source 438. The power source 438 is preferably, an electrical power source, such as but not limited to a battery, an electrochemical cell, a fuel cell, a rechargeable or primary electrochemical cell, an electrical current source or an electrical voltage source, or the like. However, the power source 438 may also be any other suitable power source. While the power source 438 is shown as included in the fluidics system 462, the power source 438 may also be disposed outside the fluidics system 462, and may thus also be an AC or DC power supply or the like. If the opening mechanisms 464A, 466A and 468A are not electrically activated, the power source 438 may be a different type of power source. For example, if the opening mechanisms 464, 466 and 468 are pneumatically actuated, the power source 438 may be a pneumatic power source (not shown), such as a source of compressed gas (not shown), a micro-compressor unit (not shown), or the like. In another example, if the opening mechanisms 464, 466 and 468 are hydraulically actuated, the power source 438 may be a hydraulic power source, such as a source of hydraulic liquid (not shown), or the like.

The controller 450 is suitably connected or coupled to the opening mechanisms 464A, 466A and 468A. The controller 450 may send suitable control signals to any of the N opening mechanisms included in the fluidics system 462, such as the opening mechanisms 464A, 466A and 468A. The control signals may actuate or activate the opening mechanisms 464A, 466A and 468A, to open the chambers 464, 466 and 468, respectively. The control signals may be electrical control signals (current signals or voltage signals, or the like), pneumatic control signals, hydraulic control signals, or any other control signal suitable for actuating the opening mechanisms 464A, 466A and 468A

The controller 450 may thus controllably open any chamber, or chamber combination or chamber group of the N chambers included in the fluidics system 462. The control signals may be adapted for actuating the opening mechanisms 464A, 466A and 468A. For example, if the opening mechanisms 464A, 466A and 468A include a piezoelectric actuator such as the piezoelectric actuator 345 of FIG. 10, the controller 450 may apply a suitable voltage difference to the piezoelectric elements (not shown) included within the opening mechanisms 464A, 466A and 468A.

The controller 450 may be any suitable type of controller known in the art. Preferably, the controller 450 may be a micro-controller which is embedded in or integrated in the fluidic system 462. Preferably, but not necessarily, the controller 450 may be fabricated on a substrate (not shown) or material layer (not shown) which is part of the fluidics system 462. For example, the controller 450 may be an integrated controller fabricated onto a silicon substrate, such as the silicon substrate 64 of FIG. 3 using standard microelectronic fabrication methods. Alternatively, the controller 450 may be a separate micro-controller, or microprocessor, suitably embedded in or attached to or connected to the fluidics system 462. The controller 450 may also be any controller, programmable micro-controller, or programmable microprocessor, known in the art.

The controller 450 may be (optionally) connected to a suitable use interface 460. The user interface may be any suitable user interface, including but not limited to a keyboard, a pointing device, a button or a group of buttons, or any other suitable interface device capable of communicating with the controller 450.

A user of the fluidics system 462 may use the user interface 460 to operate the fluidics system 462. For example, if the fluidic system 462 is a "one shot" system for performing a predetermined sequence of steps, such as the drawing of a liquid sample (or a gaseous sample) into the fluidics system 462 and performing a test on that sample (such as a medical diagnostic test, or a quantitative analytic test, or the like), the user interface may include an "on" or "activate" button or switch (not shown in detail), or the like. The user may place the sample at the appropriate position on the system 462 and press on the "on" button to start the sequence of steps. However, if the controller 450 is a programmable controller, the user may use the user interface 460 for programming the controller 450 or for entering required data or information such as but not limited to the ambient temperature, the ambient pressure or other similar data, or any other type of data required for performing the test or for operating the system 462.

It is noted that the advantage of the system 462 of FIG. 13A is that it may be used for performing various different fluidic steps, by opening any desired chamber or chambers selected from the N chambers 464, 466 and 468. Thus such a system may be used to perform a selected steps, such as but not limited to, sampling and/or mixing and/or moving, one or more liquids or other fluids (such as for example a gases or gas mixtures), as is known in the fluidics art. Each step may include the simultaneous or the sequential opening of selected chambers or selected groups of chambers as disclosed in detail hereinabove.

Turning to FIG. 13B, the system 463 of FIG. 13B is similar to the system 462 of FIG. 13A, except that the system 463 further includes valves 475 and 477. The valves 475 and 477 divide the channel 470 into compartments 470A, 470B and 470C. The valve 475 and/or the valve 477 may be a unidirectional valve allowing the passing of a fluid in one direction. The valve 475 and/or the valve 477 may be bidirectional valves. One or more of the valves 475 and 477 may (optionally) be a controllable valve and may be suitably connected to the controller 450 to receive control signals from the controller 450 (the optional control signals are schematically represented by the dashed arrows).

It is noted that the valves 475 and 477 need not be identical and may be implemented as any suitable type of valve known in the art and suitable for implementation in a fluidics system or a microfluidics system. The advantage of the system 463 is that the compartments 470A, 470B and 470C may be controllably fluidically connected or fluidically disconnected from each other by suitably closing or opening one or more of the valves 475 and 477. This is useful in systems or devices in which a series of fluidic steps need to be performed. In accordance with one exemplary non-limiting example, the controller 450 may first close the valves 475 and 477 by communicating appropriate control signals thereto, such that the compartment 470A is fluidically disconnected from the compartment 470B. The controller 450 may then open the first openable closed chamber 464 by suitably controlling or actuating the opening mechanism 464A, effectively putting the chamber 464 in fluidic communication with the compartment 470A to perform a first fluidic step, such as for example, the drawing of a fluid sample (not shown) into a flow channel (not shown) included in the fluidics system 463. After the first fluidic step is performed, the controller 450 may then open the valves 475 and 477 by communicating appropriate control signals thereto, such that the compartment 470A is fluidically in communication with the compartments 470B and 470C. The controller 450 may then open the second openable closed chamber 466 by suitably controlling or actuating the opening mechanism 466A, to perform a second fluidic step, such as for example the moving of a quantity of the sampled fluid (not shown) and of a quantity of a liquid reagent (not shown) from a reservoir fluidically communicating with the compartment 470B (the reservoir is not shown for the sake of clarity of illustration) into the compartment 470B which may serve in this non-limiting example as a reaction chamber.

It is noted that the above sequence of steps is exemplary only and is not meant to limit the number or scope, or type or sequence of the fluidic steps that may be performed using the system 463. The system 463 of FIG. 13B may thus be suitably modified to include a desired number and arrangement of valves to configure the system to perform a selected or desired number of fluidic steps as is known in the art.

It is further noted that the systems 462 and 463 of FIGS. 13A and 13B, respectively may include additional fluidic channels (not shown), and/or reservoirs (not shown), and/or mixing chambers (not shown), and/or any other fluidics components such as valves (not shown) or pumps (not shown) or sensors (not shown) or detectors (not shown), or the like, which may be used for performing any desired fluidic step or action and any desired detection or sensing steps, as is known in the art.

It is noted that the advantage of the system 462 of FIG. 13B is that it may be used for performing a selected or a desired number of fluidic steps, by opening any desired chamber or chambers selected from the N chambers 464, 466 and 468, and by suitable opening or closing one or more of the valves 475 and 477. Thus, such a system may be used to sequentially or simultaneously (or sequentially and simultaneously) perform a selected number of steps, such as but not limited to, sampling and/or mixing and/or moving, one or more fluids (such as but not limited to a liquid or a gas), as is known in the fluidics art. Each such step may include the simultaneous or the sequential opening of selected chambers or selected groups of chambers as disclosed in detail hereinabove. Different chambers of the N chambers 464, 466 and 468 or different chamber groups of the N chambers 464, 466 and 468 may be opened in different steps.

Typical applications of the openable closed chambers and the devices and systems including them may include but are not limited to, disposable microfluidics cards or systems or devices for performing analysis of a sample of liquid, such as a body fluid (including whole blood, plasma, urine, serum, cerebrospinal fluid, saliva, semen, vaginal discharge, or the like), or in a beverage or other type of liquid food.

Such cards or systems may also be used for qualitative diagnostic tests (including but not limited to pregnancy tests, detection of the presence of a specific microorganism in a sample, such as the presence of a bacterium, or a virus or another pathogen in any of the body fluids disclosed hereinabove) semi-quantitative or quantitative determination of an analyte in a sample (such as, for example, the measurement glucose in whole blood for diabetics). Such systems may also be useful for detecting or quantitatively determining the amount of pollutants or contaminants in a sample of water or of another liquid. These applications are only exemplary applications, and the openable chambers of the present invention may be included in many other devices and systems.

It is noted, that while in the example of drawing a liquid into a fluidics device 22 illustrated in FIGS. 2B and 2C, a drop of liquid 50 is placed on the surface of the device 22 and then a portion of the liquid 50 is drawn into the inlet port 46, other methods of using the devices or systems of the present invention, including but not limited to the device 22 of FIGS. 2A–2C, may be used. For example, if a large quantity of the liquid to be sampled is available, the entire fluidics device, or a portion thereof may be dipped into the liquid (not shown) or immersed in the liquid (not shown) or otherwise disposed in the liquid, such that the opening of the inlet port is disposed within the liquid. For example, a part of the device 22 may be dipped or immersed in a liquid (not shown), such that the opening 46A of the inlet port 46 of the device 22 is disposed within the liquid. After the immersing or dipping of the device 22 the openable sealing member 30 is opened or breached as disclosed in detail hereinabove, to draw a portion of the liquid into the device 22. This method may be used in cases in which a large quantity of the liquid to be sampled is available. For example, if a device is implemented as a disposable card for detecting the presence of a pollutant in water. The device or the system (such as, but not limited to the device 22 of FIG. 2A, the system 62 of FIG. 3, or the device 262 of FIG. 8) may be dipped, immersed, or partially dipped or partially immersed in a body of water such as a river, a spring or any other sample of water, such that the opening of an inlet port of the device or the system (such as but not limited to the opening 46A of FIG. 2A, the opening 94C of FIG. 3, or the opening 294C of FIG. 8, respectively) is submerged under the water. The device or system may then be activated and used as disclosed hereinabove to draw a sample of the water within the device for detecting the pollutant in the sampled water.

It will be appreciated by those skilled in the art that, while most of the examples disclosed hereinabove involved the moving of liquids into or within various fluidics systems and device, the methods and device of the present invention are not limited to the moving liquids only and are fully adaptable to the sampling and moving of other fluids such as, but not limited to, a gas or mixtures of gasses, or aerosols, or sprays, or vapors, or any other fluid compositions. The devices and methods of the present invention may be used for applications including the moving of a gas, or gasses, or aerosols, or sprays, or vapors into a fluidics device or system. For example, the devices and systems of the present invention including but not limited to the devices and systems illustrated in FIGS. 2B, 2D, 3, 8, 9A, 9B, 10 and 13 may be configured as devices and systems for sampling and/or moving a gas or gasses, or an aerosol, or a spray, or vapors.

Thus, the device 62 of FIG. 3 may be part of a fluidics device for sampling and analyzing air. In accordance with one exemplary non-limiting example, the device 62 may be adapted for measuring the amount of an air pollutant such as carbon monoxide (CO) or nitrogen dioxide ($NO_2$) in air. In such a device, the controlled opening of the openable closed chamber 68 as disclosed in detail hereinabove may draw an amount of polluted air to be analyzed into the flow channel 78 of the device 62 due to the suction of air from the outside of the device 62 into the inlet port 94.and the flow channel 78. The suction is caused by the reduction of the pressure within the flow channel 78 after the opening of the openable closed chamber 68. The amount of air flowing into the device 62 through the inlet port 94 may depend, inter alia, on the ambient temperature, the ambient pressure P1 outside the device 62, on the pressure level P2 within the openable closed chamber 68, on the volumes of the openable closed chamber 68 and of the flow channel 78 and on the volume of any other channels or passages intervening between the opening 94C and the openable closed chamber 68. The pressure level P2 within the openable closed chamber 68, the volumes of the openable closed chamber 68 and of the flow channel 78 and the volume of any other channels or passages intervening between the opening 94C and the openable closed chamber 68, may be suitably modified or adapted to control the amount of air drawn into the flow channel 78 to ensure proper sampling.

The air sample within the flow channel 78 may then be suitably analyzed to determine the amount of CO or $NO_2$ in the sampled air. It is noted that the analysis of the pollutant gas (such as CO or $NO_2$) within the air sample may be performed by a suitable sensor (not shown) disposed within the device 62. For example, an optical sensor (not shown) may be used to determine the amount of CO or $NO_2$ within the sampled air by analyzing the absorption spectrum of the air sample within the device 62. However, other sensors or sensing subsystems (not shown) may be integrated within the device 62. It is noted that devices and methods for analysis of the components of a gas mixture or of air samples are known in the art, are not the subject matter of the present invention and are therefore not shown in detail hereinafter.

It is noted that while, preferably, the openable closed chambers of the present invention are evacuated using the vacuum bonding step disclosed in detail hereinabove (with reference to constructing the device illustrated in FIG. 3), other suitable methods known in the art for reducing the pressure level in a chamber or for creating reduced pressure or vacuum in a sealed chamber may be used.

For example, a reactive substance, such as a magnesium filament or another combustible or chemically reactive substance may be introduced into the chambers and ignited or induced to react with one or more of the gases contained in the air trapped within the chambers. For example, a magnesium filament (not shown) may be introduced into the chamber 68 of FIG. 3, the chamber 68 may then be sealed by bonding the sealing layer 98 to the substrate 64, as disclosed hereinabove, the magnesium filament may be ignited by suitable electrodes (not shown) connected thereto to consume some of the gases sealed within the chamber 68. The pressure in the chamber 68 may thus be lowered or reduced due to the conversion of the oxygen and maybe some of the nitrogen in the air within the chamber 68 into of magnesium oxide and/or magnesium nitride having a lower volume than the volume of the chemically reacted oxygen and/or nitrogen. Care should be taken to ensure that the materials from which the device 62 is made can withstand the temperatures generated during the reaction between the magnesium and the gas or gases included in the chamber 68.

It is further noted that while it is possible to construct the openable closed chambers of the invention by using a passage formed through a substrate and sealed by two sealing layers, as disclosed in detail hereinabove, other methods of constructing the openable closed chambers of the present invention may also be used.

Reference is now made to FIGS. 14A–14D which are schematic part cross-sectional diagrams illustrating another method for producing a fluidics device having an openable closed chamber, in accordance with a preferred embodiment of the present invention.

Figure 14A:
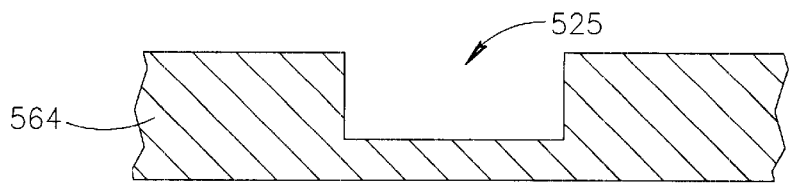
FIGS. 14A–14D are schematic part cross-sectional diagrams illustrating another method for producing a fluidics device having an openable closed chamber, in accordance with a preferred embodiment of the present invention.

Turning to FIG. 14A, a substrate layer 564 having a cavity 525 formed therein. The substrate layer 564 may be made from a suitable gas impermeable plastic material such as, but not limited to a polymethyl metacrylate (Perspex®) or from a suitable moldable plastic. The cavity 525 may be formed within the substrate 564 by machining or laser ablation methods or the like. Alternatively, if the substrate 564 is made from a moldable plastic material or polymer such as, but not limited to PVDC, the cavity 525 may be formed by suitable molding methods, as is known in the art.

Figure 14B:
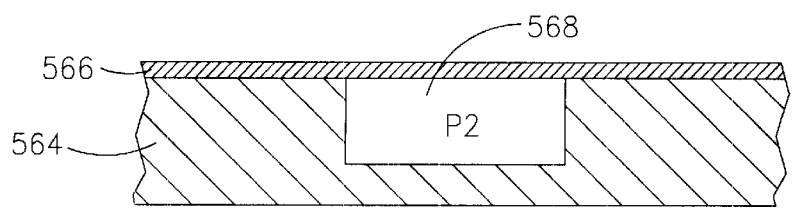

Turning now to FIG. 14B, the substrate 564 is now put in an evacuated bonder (not shown) and a sealing layer 566, preferably made from aluminum or from another gas-impermeable electrically conductive metal such as copper or another suitable metal, is suitably bonded under vacuum to the substrate layer 564. The bonding glue or other bonding material is not shown in FIGS. 14B–14D, for the sake of clarity of illustration. After the bonding step is completed. The chamber 568 is defined by the walls of the cavity 525 and the sealing layer 566 has a pressure P2 therewithin. The pressure P2 is lower than the typical ambient atmospheric pressure. It is noted that while the sealing layer 566 is preferably made from aluminum or from another gas-impermeable electrically conductive metal, the layer 566 may be made from other suitable electrically conductive material or may include another suitable electrically conductive material, such as, but not limited to, copper.

Figure 14C:
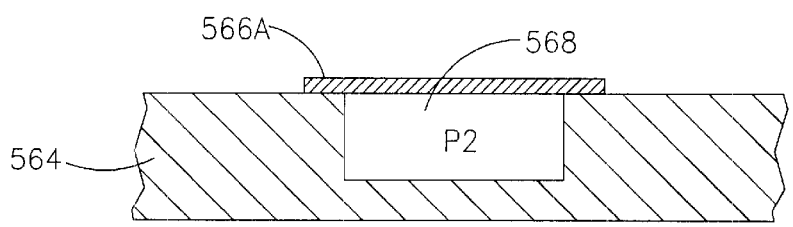

Turning now to FIG. 14C, the sealing layer 566 is now patterned using a suitable photo-resist (not shown), a suitable mask (not shown) and standard developing, etching, and resist stripping methods, as is known in the art, to remove part of the sealing layer 566 leaving a portion 566A sealingly attached to the substrate 564 over the cavity 525. The portion 566A of the sealing layer 566 functions as a breachable or openable heating element. The part 566A of the sealing layer 566 is electrically contiguous, or operatively electrically connected to electrically conducting members (not shown). The electrically conducting members may be patterned and suitably formed from the sealing layer 566, in a way similar to the way of formation of the electrically conducting members 120 and 122 (FIG. 4) which are electrically connected to the heating element 84 (FIG. 4). Preferably, the shape of the conducting members (not shown) connected to or contiguous with the portion 566A of FIG. 14C is similar to the shape of the conducting members 120 and 122 of FIG. 4. However, the conducting members (not shown) connected to or contiguous with the portion 566A of FIG. 14C may be shaped or constructed differently than the conducting members 120 and 122 of FIG. 4.

Figure 14D:
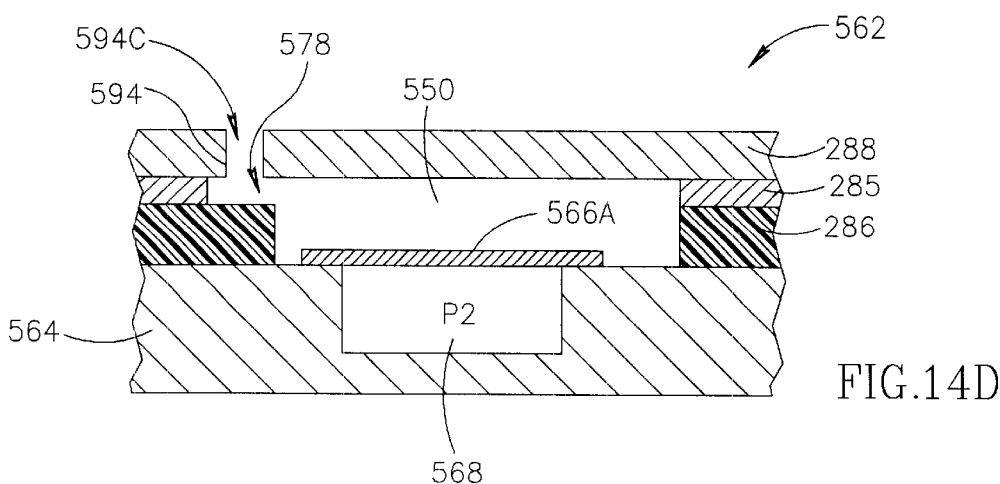

Turning now to FIG. 14D, the device 562 (only a part thereof is illustrated in FIG. 14D) is completed by bonding a suitably punched first spacer layer 286 to the substrate layer 564, bonding a suitably punched second spacer layer 285 to the first spacer layer 286 and bonding a suitable cover layer 288 to the second spacer layer 285. The first spacer layer 286, the second spacer layer 285, and the cover layer 288 may be suitable Kapton® layers constructed, punched and bonded, as disclosed in detail hereinabove. The opening 594C, the inlet port 594 and the flow channel 578 may or may not be identical to the opening 294C, the inlet port 294 and the flow channel 278 of the cover layer 288 illustrated in FIG. 8.

The chamber 550 formed within the device 562, overlies the portion 566A of the sealing layer 566 which seals the chamber 568. In operation, a suitable current may be passed through the portion 566A of the sealing layer 566. The heat developed by the power dissipation within the portion 566A of the sealing layer 566 due to the electrical resistance of the portion 566A of the sealing layer 566 may melt or partly melt or otherwise breach or disrupt the portion 566A of the sealing layer 566 to form one or more holes (not shown in FIG. 14D) or passages (not shown in FIG. 14D) or openings (not shown in FIG. 14D) in the portion 566A of the sealing layer 566. Thus, the portion 566A of the sealing layer 566 functions as a self breaching heating element, or as a self opening sealing member.

When such holes or openings or passages are formed in the portion 566A of the sealing layer 566, the chamber 568 and the chamber 550 are put in fluidic communication with each other, and pressure equalization between the chamber 568 and the chamber 550 may occur as disclosed in detail hereinabove for other types of devices and system having other types of openable closed chambers. The opening of the chamber 568 may thus be used to perform various fluidic steps, such as drawing a liquid (not shown) or a gas (not shown) into the device 562, or moving a liquid or a gas within the device 562, or any other suitable fluidic step for moving a fluid into or within the device 562, as disclosed in detail hereinabove.

While the invention has been described with respect to a limited number of embodiments, it will be appreciated that many variations, modifications and other applications of the invention may be made which are within the scope and spirit of the invention.

What is claimed is:

1. A method for moving a fluid in a fluidics system, the method comprising the steps of:
   providing a flow channel having a first pressure level therein;
   providing at least one openable closed chamber, said at least one closed chamber is fluidically isolated from said flow channel by an openable sealing member, said at least one openable closed chamber has a second pressure level therewithin, said second pressure level is lower than said first pressure level; and
   opening said openable sealing member to fluidically connect said at least one chamber with said flow channel to reduce the pressure within said flow channel to move a fluid disposed within said flow channel.

2. The method according to claim 1 wherein said fluid is selected from a liquid, a gas, a mixture of gases, and an aerosol.

3. The method according to claim 1 wherein said first pressure level is the pressure level outside said fluidics system.

4. The device according to claim 1, wherein said openable sealing member is selected from at least one layer of openable sealing material, and a valve.

5. A method for moving a liquid into a fluidics system, the method comprising the steps of:
   providing a flow channel, said flow channel is in operative communication with at least one inlet port, said at least one inlet port is sealingly covered with said liquid, said flow channel has a first pressure level therein;
   providing at least one openable closed chamber, said at least one closed chamber is fluidically isolated from said flow channel by an openable sealing member, said at least one openable closed chamber has a second pressure level therewithin, said second pressure level is lower than said first pressure level; and
   opening said openable sealing member to fluidically connect said at least one chamber with said flow channel to reduce the pressure within said flow channel to move said liquid into said flow channel.

6. The method according to claim 5 wherein said first pressure level is the pressure level outside said fluidics system.

7. The device according to claim 5, wherein said openable sealing member is selected from at least one layer of openable sealing material, and a valve.

8. A method for moving a fluid into a fluidics system, the method comprising the steps of:
   providing a flow channel, said flow channel is in operative communication with at least one inlet port, said at least one inlet port is disposed within said fluid, said flow channel has a first pressure level therein;
   providing at least one openable closed chamber, said at least one closed chamber is fluidically isolated from said flow channel by an openable sealing member, said at least one openable closed chamber has a second pressure level therewithin, said second pressure level is tower than said first pressure level; and
   opening said at least one closed chamber to fluidically connect said at least one chamber with said flow channel for reducing the pressure within said flow channel to move said fluid into said flow channel.

9. The method according to claim 8 wherein said fluid is selected from a liquid, a gas, a mixture of gases, and an aerosol.

10. The method according to claim 8 wherein said first pressure level is the pressure level outside said fluidics system.

11. A method for constructing a fluidic device, the method comprising the steps of:
    providing at least one flow channel within said device; and
    providing at least one controllably openable closed chamber, said at least one closed chamber is fluidically isolated from said at least one flow channel by an openable sealing member, said closed chamber has a first pressure level therewithin, said first pressure level is lower than the pressure level outside said fluidic device.

12. The method according to claim 11 wherein said at least one openable closed chamber is configured for being controllably opened to allow pressure equalization between said at least one openable chamber and said at least one flow channel.

13. A method for moving a liquid into a fluidics system, the method comprising the steps of:
    providing a flow channel having at least one inlet port;
    providing one or more openable closed chambers, the pressure within said one or more openable closed chambers is lower than the ambient pressure outside said fluidic system, each chamber of said one or more openable closed chambers is configured for being controllably openable, each chamber of said one or more openable closed chambers is fluidically isolated from said flow channel by an openable sealing member said one or more openable closed chambers are configured for being controllably opened by opening said openable sealing member to allow said one or more openable chambers to fluidically communicate with said flow channel and to allow pressure equalization between said flow channel and said one or more openable closed chambers;
    sealingly covering said at least one inlet port of said flow channel with said liquid; and
    opening at least one chamber of said one or more openable closed chambers for moving at least a portion of said liquid into said flow channel.

14. The method according to claim 13 wherein said step of opening comprises opening one or more chambers of said one or more openable closed chambers to reduce the pressure within said flow channel below said ambient pressure.

15. The method according to claim 13 wherein said moving of said liquid into said flow channel is controlled by varying the number of chambers opened in said step of opening.

16. The method according to claim 13 wherein said one or more openable closed chambers comprises a plurality of openable closed chambers, at least one of said plurality of openable closed chambers has a volume different than the volume of the remaining chambers of said plurality of openable closed chambers and wherein said moving of said liquid into said flow channel is controlled by the total volume of the chambers opened in said step of opening.

17. The method according to claim 13 wherein said one or more openable closed chambers comprises a plurality of openable closed chambers, said step of opening comprises simultaneously or sequentially opening a selected number of chambers of said plurality of openable closed chambers to control one or more parameters of flow of said liquid into said flow channel, through said at least one inlet port.

18. The method according to claim 17 wherein said one or more parameters of flow are selected from the rate of flow of said liquid into said flow channel, the amount of said liquid flowing into said flow channel, the rate of change of the rate of flow of said liquid within said flow channel and combinations thereof.

19. A method for moving a fluid into a fluidics system, the method comprising the steps of:
provided a flow channel having at least one inlet port, said at least one inlet port has an opening;
providing one or more openable closed chambers, the pressure within said one or more openable closed chambers is lower than the ambient pressure outside said fluidic system, each chamber of said one or more closed chambers is fluidically isolated from said flow channel by an openable sealing member, said one or more openable closed chambers are configured for being controllably opened by opening said openable sealing member to allow said one or more openable chambers to fluidically communicate with said flow channel to allow pressure equalization between said flow channel and said one or more openable closed chambers;
disposing said opening of said at least one inlet port of said flow channel within said fluid; and
opening at least one chamber of said one or more closed chambers for moving at least a portion of said fluid into said flow channel.

20. The method according to claim 19 wherein said step of opening comprises opening one or more chambers of said one or more openable closed chambers to reduce the pressure within said flow channel below said ambient pressure.

21. The method according to claim 19 wherein said moving of said fluid into said flow channel is controlled by varying the number of chambers opened in said step of opening.

22. The method according to claim 19 wherein said one or more openable closed chambers comprises a plurality of openable closed chambers, at least one of said plurality of openable closed chambers has a volume different than the volume of the remaining chambers of said plurality of openable closed chambers and wherein said moving of said fluid into said flow channel is controlled by the total volume of the chambers opened in said step of opening.

23. The method according to claim 19 wherein said one or more openable closed chambers comprises a plurality of openable closed chambers, said step of opening comprises simultaneously or sequentially opening a selected number of chambers of said plurality of openable closed chambers to control one or more parameters of flow of said fluid into said flow channel, through said at least one inlet port.

24. The method according to claim 23 wherein said one or more parameters of flow are selected from the rate of flow of said fluid into said flow channel, the amount of said fluid flowing into said flow channel, the rate of change of the rate of flow of said fluid within said flow channel and combinations thereof.

25. The method according to claim 19 wherein said fluid is selected from a liquid, a gas, a mixture of gases, and an aerosol.

26. A method for moving a liquid within a fluidics system, the method comprising:
providing a flow channel having at least a first end and a second end thereof;
providing one or more openable closed chambers, the pressure within said one or more openable closed chambers is lower than the ambient pressure outside said fluidic system, each chamber of said one or more openable closed chambers is fluidically isolated from said flow channel by an openable sealing member, each chamber of said one or more openable closed chambers is configured for being controllably opened by opening said openable sealing member to allow pressure equalization between at least a portion of said flow channel and said one or more openable chambers;
providing a quantity of said liquid disposed within said flow channel, said quantity of said liquid is disposed at a position between said first end and said second end of said flow channel, said first end of said flow channel opens outside said fluidic system and is subjected to said ambient pressure; and
opening at least one chamber of said one or more openable closed chambers to put said at least one chamber in fluidic communication with said portion of said flow channel for lowering the pressure within said portion of said flow channel below said ambient pressure to move said liquid within said flow channel.

27. The method according to claim 26 wherein said moving of said liquid into said flow channel is controlled by varying the number of chambers opened in said step of opening.

28. The method according to claim 26 wherein said one or more openable closed chambers comprises a plurality of openable closed chambers, at least one of said plurality of openable closed chambers has a volume different than the volume of the remaining chambers of said plurality of openable closed and wherein said moving of said liquid into said flow channel is controlled by the combined volume of the chambers opened in said step of opening.

29. The method according to claim 26 wherein said one or more openable closed chambers comprises a plurality of openable closed chambers, and wherein said step of opening comprises simultaneously or sequentially opening a selected number of chambers of said plurality of openable closed chambers to control one or more parameters of flow of said liquid flowing into said flow channel.

30. The method according to claim 29 wherein said one or more parameters of flow are selected from the rate of flow of said liquid into said flow channel, the amount of said liquid flowing into said flow channel, the rate of change of the rate of flow of said liquid within said flow channel and combinations thereof.

31. A method for moving a liquid within or into a microfluidics device, the method comprising opening at least one openable closed chamber included in said microfluidics device, the pressure within said at least one closed chamber is lower than the ambient pressure outside said microfluidics device, said at least one closed chamber is configured to fluidically communicate with a flow channel included in said microfluidics device upon said opening, said opening comprises opening an openable sealing member fluidically isolating said at least one closed chamber from said flow channel, said opening produces a net force acting on a quantity of said liquid disposed within or on said microfluidics device to move at least a portion of said quantity of liquid within or into said device through said flow channel.

32. A method for moving a liquid disposed within at least one flow channel in a microfluidics device, the method comprising opening at least one openable closed chamber included in said microfluidics device, said at least one openable closed chamber is fluidically isolated from said at least one flow channel by an openable sealing member, the pressure within said at least one closed chamber is lower than the ambient pressure outside said microfluidics device, said at least one closed chamber is configured to fluidically communicate with said at least one flow channel upon said opening, said opening comprises opening said openable sealing member, to produce a net force acting on said liquid for moving at least a portion of said liquid within said device.

33. A method for introducing a liquid into a microfluidics device, the method comprising the steps of:
   sealingly covering an opening of at least one inlet port included in said microfluidics device with a quantity of said liquid, said inlet port is in fluidic communication with at least one flow channel included within said microfluidics device; and
   opening at least one closed chamber included in said microfluidics device, said at least one closed chamber is fluidically isolated from said at least one flow channel by an openable sealing member, said opening comprises opening said openable sealing member, the pressure within said at least one closed chamber is lower than the ambient pressure outside said microfluidics device, said at least one closed chamber is configured to fluidically communicate with said at least one flow channel upon said opening to produce a net force acting on a portion of said liquid disposed within said microfluidics device to move at least a portion of said quantity of liquid into said at least one flow channel.

34. A method for moving a fluid within or into a microfluidics device including at least one flow channel, the method comprising opening at least one closed chamber included in said microfluidics device, the pressure within said at least one closed chamber is lower than the ambient pressure outside said microfluidics device, said at least one closed chamber is fluidically isolated from said at least one flow channel by an openable sealing member, said opening comprises opening said openable sealing member, said at least one closed chamber is configured to fluidically communicate with said at least one flow channel included in said microfluidics device upon said opening, said opening reduces the pressure within said at least one flow channel of said microfluidics device to move at least a portion of a quantity of said fluid disposed within or in contact with at least part of said at least one flow channel along said at least one flow channel.

35. The method according to claim 34 wherein said fluid is selected from a liquid, a gas, a mixture of gases, and an aerosol.

36. A method for moving a fluid disposed within at least one flow channel in a microfluidics device, the method comprising opening at least one openable closed chamber included in said microfluidics device, said at least one closed chamber is fluidically isolated from said at least one flow channel by an openable sealing member, the pressure within said at least one closed chamber is lower than the ambient pressure outside said microfluidics device, said opening comprises opening said openable sealing member, said opening fluidically connects said at least one openable closed chamber with said at least one flow channel to induce a flow of said fluid for moving at least a portion of said fluid within said at least one flow channel.

37. The method according to claim 36 wherein said fluid is selected from a liquid, a gas, a mixture of gases, and an aerosol.

38. A method for introducing a fluid into a microfluidics device, the method comprising the steps of:
   disposing an opening of at least one inlet port included in said microfluidics device within said fluid, said inlet port is in communication with at least one flow channel included within said microfluidics device; and
   opening at least one openable closed chamber included in said microfluidics device, the pressure within said at least one closed chamber is lower than the ambient pressure outside said microfluidics device, said at least one closed chamber is fluidically isolated from said at least one flow channel by an openable sealing member, said opening comprises opening said openable sealing member said opening fluidically connects said at least one openable chamber with said at least one flow channel to induce a flow of said fluid for moving at least a portion of said fluid into said at least one flow channel through said opening of said at least one inlet port.

39. The method according to claim 38 wherein said fluid is selected from a liquid, a gas, a mixture of gases, and an aerosol.

40. A device for moving a fluid in a fluidic system, the device comprising:
   one or more openable closed chambers, the pressure within said one or more openable closed chambers is lower than the ambient pressure outside said fluidic system, at least one chamber of said one or more closed chambers is fluidically isolated by an openable sealing member from a flow channel included within said fluidic system, said one or more openable closed chambers are configured for being controllably opened by opening said sealing member to fluidically connect said one or more openable chambers with said flow channel to allow pressure equalization between said flow channel and said one or more openable chambers, for moving said fluid within or into said fluidic system.

41. The device according to claim 40 wherein said fluid is selected from a liquid, a gas, a mixture of gases, and an aerosol.

42. The device according to claim 40 wherein said at least one of said one or more openable closed chambers comprises a plurality of operatively interconnected chambers.

43. The device according to claim 42 wherein at least one chamber of said plurality of operatively interconnected chambers is configured for being controllably opened.

44. The device according to claim 42 wherein more than one chamber of said plurality of operatively interconnected chambers is configured for being controllably opened.

45. The device according to claim 40 wherein said one or more openable closed chambers are formed within a substrate.

46. The device according to claim 45 wherein said substrate is a multi layered substrate.

47. The device according to claim 40 wherein at least one chamber of said one or more openable closed chambers comprises an openable sealed cavity formed within a substrate.

48. The device according to claim 40 wherein at least one chamber of said one or more openable closed chambers comprises a passage formed within a substrate, and at least two sealing members sealingly attached to said substrate.

49. The device according to claim 40 wherein at least one chamber of said one or more openable closed chambers is configured for being controllably opened by an opening mechanism configured for opening said sealing member.

50. The device according to claim 40 wherein said one or more openable closed chambers comprises a plurality of individually openable closed chambers, the pressure within each openable closed chamber of said plurality of individually openable closed chambers is lower than the ambient pressure outside said fluidic system.

51. The device according to claim 40 each chamber of said plurality of individually openable closed chambers is selectably openable.

52. The device according to claim 51 wherein said fluidic system includes a controller for controlling the opening of one or more chambers of said plurality of individually openable closed chambers.

53. The device according to claim 52 wherein said controller is a programmable controller, configured for being programmed to controllably open any combination of chambers selected from said plurality of individually openable closed chambers.

54. The device according to claim 50 wherein all openable closed chambers of said plurality of individually openable closed chambers have a substantially similar volume.

55. The device according to claim 50 wherein at least one openable closed chamber of said plurality of individually openable closed chambers has a volume different than the volume of the remaining openable closed chambers of said plurality of individually openable closed chambers.

56. The device according to claim 40 wherein at least one chamber of said one or more openable closed chambers comprises an openable closed primary chamber and one or more non-openable secondary chambers, said one or more secondary chambers are in operative communication with said openable primary chamber.

57. The device according to claim 40 wherein each chamber of said one or more openable closed chambers comprises:
   a portion of a substrate having a cavity formed therein; and
   a layer of sealing material sealingly attached to said substrate for sealing said cavity, said openable sealing member comprises said layer of sealing material.

58. The device according to claim 57 wherein said substrate is a multi layered substrate.

59. The device according to claim 57 wherein said openable sealing member is configured for being mechanically opened by an opening member included in said fluidic system.

60. The device according to claim 57 wherein said openable sealing member is configured for being mechanically opened by a controllably actuated opening mechanism included in said fluidic system.

61. The device according to claim 57 wherein said openable sealing member comprises said layer of sealing material attached to said substrate and a heating element thermally coupled to said layer of sealing material.

62. The device according to claim 61 wherein said heating element comprises an electrically resistive member, operatively connectable to an electrical power source.

63. The device according to claim 61 wherein said heating element is attached to or deposited on said layer of sealing material.

64. The device according to claim 57 wherein said openable sealing member comprises a sealing layer attached to said substrate and at least one electrically resistive member attached to said sealing layer or thermally coupled thereto, said at least one electrically resistive member is operatively connected to an electrical power source included in said fluidics system.

65. The device according to claim 64 wherein said openable sealing member is configured to be thermo-mechanically opened by controllably passing current from said power source through said at least one electrically resistive member for heating said at least one electrically resistive member and said sealing layer, said heating generates mechanical stress in said sealing layer to open said layer by forming at least one opening therein.

66. The device according to claim 64 wherein said sealing layer comprises a meltable substance, said openable sealing member is configured to be thermally opened by controllably passing an electrical current from said electrical power source through said at least one resistive member for heating said at least one resistive member and said sealing layer attached thereto or thermally coupled thereto, said heating melts at least a portion of said sealing layer to form at least one opening therethrough.

67. The device according to claim 40 wherein said openable sealing member includes a layer comprising an electrically resistive material, said layer is attached to said substrate to seal said cavity, said layer is operatively connectable to an electrical power source included in said fluidics system.

68. The device according to claim 67 wherein said layer is configured for being thermally opened by controllably passing current from said electrical power source through said layer for melting, burning, or vaporizing at least a portion of said layer to open or breach said openable sealing member.

69. The device according to claim 40 wherein at least one openable closed chamber of said one or more openable closed chambers comprises:
   a portion of a substrate having a passage passing therethrough, said passage has a first opening and a second opening;
   said openable sealing member sealingly attached to said substrate for sealing said first opening; and
   a second sealing member sealingly attached to said substrate for sealing said second opening.

70. The device according to claim 69 wherein said substrate is a multi layered substrate.

71. The device according to claim 69 wherein said openable sealing member is configured for being mechanically opened by an opening member included in said fluidic system.

72. The device according to claim 69 wherein said openable sealing member is configured for being mechanically opened by a controllably actuated opening mechanism included in said fluidic system.

73. The device according to claim 69 wherein said openable sealing member comprises a sealing layer and at least one resistive member attached to said sealing layer or thermally coupled thereto, said at least one resistive member is operatively connectable to an electrical power source included in said fluidics system.

74. The device according to claim 73 wherein said openable sealing member is configured for being thermo-mechanically breached by controllably passing current from said electrical power source through said at least one resistive member for heating said at least one resistive member and said sealing layer attached thereto or thermally coupled thereto, said heating produces mechanical stress in said sealing layer to breach said sealing layer.

75. The device according to claim 73 wherein said sealing layer comprises a meltable substance, said openable sealing member is configured to be thermally opened by controllably passing an electrical current from said electrical power source through said at least one resistive member for heating said at least one resistive member and said sealing layer attached thereto or thermally coupled thereto, said heating melts at least a portion of said sealing layer to form at least one opening therethrough.

76. The device according to claim 68 wherein said openable sealing member comprises a resistive layer attached to said substrate to seal said first opening, said resistive layer is operatively electrically connectable to an electrical power source.

77. The device according to claim 76 wherein said electrical power source is included in said fluidics system.

78. The device according to claim 76 wherein said resistive layer is configured to be thermally opened by controllably passing an electrical current from said power source through said resistive layer for melting, burning, or vaporizing at least a portion of said resistive layer to open said resistive layer.

79. The method according to claim 40, wherein said openable sealing member is selected from at least one layer of openable sealing material, and a valve.

80. In a microfluidics system, a device for moving a fluid within the microfluidics system, the device comprising:

at least one openable closed chamber, the pressure within said closed chamber is lower than the pressure outside said microfluidics system, said at least one closed chamber is fluidically isolated from a flow channel included within said fluidic system by an openable sealing member, said openable sealing member is configured for being controllably opened to fluidically connect said at least one openable chamber with said flow channel, to allow pressure equalization between said flow channel and said at least one openable chamber for moving said fluid within or into said flow channel.

81. The device according to claim 80 wherein said at least one openable chamber comprises an openable sealed cavity formed within a substrate.

82. The device according to claim 80 wherein at least part of said microfluidics system is formed within said substrate.

83. The device according to claim 80 wherein said substrate is a multi-layered substrate.

84. A microfluidics system comprising:

a flow channel disposed within said microfluidics system; and at least one openable closed vacuum chamber, said at least one closed vacuum chamber is fluidically isolated from said flow channel by an openable sealing member, said openable sealing member is configured for being controllably opened to fluidically connect said at least one openable vacuum chamber with said flow channel to allow pressure equalization between said flow channel and said at least one openable vacuum chamber for moving a fluid into or within said microfluidics system.

85. A microfluidics device comprising:

at least one openable closed chamber, the pressure within said at least one closed chamber is lower than the ambient pressure outside said microfluidics device, said at least one closed chamber is fluidically isolated from a flow channel included within said microfluidics device by an openable sealing member, said sealing member is configured for being controllably opened to fluidically connect said at least one openable chamber with said flow channel to induce a fluid to flow within or into said flow channel.

86. The device according to claim 85 wherein said fluid is selected from a liquid, a gas, a mixture of gases, and an aerosol.

87. The method according to claim 85, wherein said openable sealing member is selected from at least one layer of openable sealing material, and a valve.

* * * * *